United States Patent [19]
Cotton et al.

[11] Patent Number: 5,577,075
[45] Date of Patent: Nov. 19, 1996

[54] DISTRIBUTED CLOCKING SYSTEM

[75] Inventors: John M. Cotton, East Norwalk, Conn.; Nicholas Necula, Mt. Vernon, N.Y.; Bidyut Parruck, Stratford, Conn.; Fryderyk Tyra, Stamford, Conn.; Alex T. Wissink, Woodbridge, Conn.; Enrique Abreu, Huntington, Conn.

[73] Assignee: IPC Information Systems, Inc., Stamford, Conn.

[21] Appl. No.: 766,647

[22] Filed: Sep. 26, 1991

[51] Int. Cl.⁶ .................................... H04L 7/00
[52] U.S. Cl. .......................... 375/356; 370/58.3
[58] Field of Search .................... 375/106, 107, 375/108, 354, 356, 357; 370/60, 58.3; 455/51

[56] References Cited

U.S. PATENT DOCUMENTS

| | | | |
|---|---|---|---|
| 4,142,069 | 2/1979 | Stover | 375/107 |
| 4,173,713 | 11/1979 | Giesken et al. | 179/15 |
| 4,201,889 | 5/1980 | Lawrence et al. | 370/58 |
| 4,201,891 | 5/1980 | Lawrence et al. | 370/58 |
| 4,317,962 | 3/1982 | Cox et al. | 370/110.1 |
| 4,736,393 | 4/1988 | Grimes et al. | 375/107 |
| 4,817,085 | 3/1989 | De Prycker | 370/60 |
| 4,903,260 | 2/1990 | Boettle et al. | 370/60 |
| 4,916,690 | 4/1990 | Barri | 370/60 |
| 4,939,752 | 7/1990 | Literati et al. | 375/107 |
| 4,998,275 | 3/1991 | Braunstein et al. | 379/164 |
| 5,068,877 | 11/1991 | Near et al. | 455/51 |
| 5,153,874 | 10/1992 | Kohno | 375/38 |

FOREIGN PATENT DOCUMENTS

| | | |
|---|---|---|
| WO8804869 | 6/1988 | WIPO. |
| WO8807297 | 9/1988 | WIPO. |
| WO8911764 | 11/1989 | WIPO. |
| WO9004316 | 4/1990 | WIPO. |

OTHER PUBLICATIONS

"Implementation of a 16 to 16 Switching Element for ATM Exchanges," by P. Barri et al., *IEEE Journal on Selected Areas in Communications*, vol. 9, No. 5, pp. 751–757 (Jun. 1991).

"Effects of Output Buffer Sharing on Buffer Requirements in an ATDM Packet Switch," by A. E. Eckberg et al., AT&T Bell Laboratories, Holmdel, New Jersey 07733, pp. 459–465 (IEEE 1988).

"Metastability Behavior of CMOS ASIC Flip–Flops in Theory and Tests," by Jens U. Horstmann et al., *IEEE Journal of Solid–State Circuits*, vol. 24, No. 1 pp. 146–157 (Feb. 1989).

"Input v. Output Queueing on a Space–Division Packet Switch," by Mark J. Karol et al., *IEEE Global Telecommunications Conference*, Conference Record, vol. 2, Session 19.4, pp. 659–665 (Dec. 1986).

(List continued on next page.)

*Primary Examiner*—Stephen Chin
*Attorney, Agent, or Firm*—Morgan & Finnegan

[57] ABSTRACT

A clocking mechanism with improved fault tolerance for synchronizing a distributed processing system includes a plurality of distributed clock sources. Each clock source may operate as a master clock for synchronizing the operations of the entire system or as a slave to an external clock while remaining available, in a backup capacity, to operate as a master clock in the event of a failure in the previous master clock. A clock selection mechanism is provided in each distributed switch element for selecting the best clock available to each switch element for synchronization. A failure recovery mechanism is provided with fast and automatic recovery in the event of a failure in a master clock. A data extraction mechanism is also provided capable of sampling a bit stream that is not phase-aligned, even in the presence of timing jitter and pulse width distortion, and having provisions for detecting a bit slip.

34 Claims, 13 Drawing Sheets

OTHER PUBLICATIONS

"Metastable Behavior in Digital Systems," by Lindsay Kleeman et al., *IEEE Design & Test of Computers*, pp. 4–19 (Dec. 1987).

"A Shared Buffer Memory Switch for an ATM Exchange," by Hiroshi Kuwahara et al., pp. 118–122 (IEEE 1989).

"System 12: Review of the Fundamental Concepts," by R. Van Malderen, *Electrical Communication*, vol. 59, No. 1/2, pp. 20–28 (1985).

"Large–Scale ATM Multistage Switching Network with Shared Buffer Memory Switches," by Yoshito Sakurai et al., *IEEE Communications*, vol. 29, No. 1 pp. 90–96 (Jan. 1991).

"The Behavior of Flip–Flops Used as Synchronizers and Prediction of Their Failure Rate," by Harry J. M. Veendrick, *IEEE Journal of Solid–State Circuits*, vol. 1 SC–15, No. 2 pp. 169–176 (Feb. 1989).

| Case Number | Bit Alignment with Phases Phase 0 1 2 3 | Flip-Flop Values ($D_0$, $D_1$, $D_2$, $D_3$) |
|---|---|---|
| 1 | | 1111 |
| 2 | | 1111 or 0111 |
| 3 | | 0111 |
| 4 | | 0111 or 0011 |
| 5 | | 0011 |
| 6 | | 0011 or 0001 |
| 7 | | 0001 |
| 8 | | 0001 or 0000 |
| 9 | | 0000 |
| 10 | | 1000 or 0000 |
| 11 | | 1000 |
| 12 | | 1100 or 1000 |
| 13 | | 1100 |
| 14 | | 1110 or 1100 |
| 15 | | 1110 |
| 16 | | 1111 or 1110 |

FIG. 7

| Pattern Number | Sampled Pattern ($D_0, D_1, D_2, D_3$) | Respective Cases | Assigned Data Value | Assigned SMPLPOSN_OUT Value |
|---|---|---|---|---|
| 1 | 0 0 0 0 | 8, 9, 10 | 0 | SMPLPOSN_IN |
| 2 | 0 0 0 1 | 6, 7, 8 | 0 | 1 |
| 3 | 0 0 1 1 | 4, 5, 6 | SC | SMPLPOSN_IN |
| 4 | 0 1 1 1 | 2, 3, 4 | 1 | 0 |
| 5 | 1 1 1 1 | 1, 2, 16 | 1 | SMPLPOSN_IN |
| 6 | 1 1 1 0 | 14, 15, 16 | 1 | 1 |
| 7 | 1 1 0 0 | 12, 13, 14 | SC | SMPLPOSN_IN |
| 8 | 1 0 0 0 | 10, 11, 12 | 0 | 0 |

SC = requires Special Consideration

FIG. 8A

COMBINATIONAL LOGIC TRUTH TABLE FOR DATA EXTRACTOR

| INPUTS | | | | | OUTPUTS | |
|---|---|---|---|---|---|---|
| SMPLPOSN_IN | $D_0$ | $D_1$ | $D_2$ | $D_3$ | SMPLPOSN_OUT | DATA_OUT |
| 1 | 0 | 0 | 0 | 0 | 1 | 0 |
| 0 | 0 | 0 | 0 | 0 | 0 | 0 |
| 1 | 0 | 0 | 0 | 1 | 1 | 0 |
| 0 | 0 | 0 | 0 | 1 | 1 | 0 |
| 1 | 0 | 0 | 1 | 1 | 1 | 0 |
| 0 | 0 | 0 | 1 | 1 | 0 | 1 |
| 1 | 0 | 1 | 1 | 1 | 0 | 1 |
| 0 | 0 | 1 | 1 | 1 | 0 | 1 |
| 1 | 1 | 1 | 1 | 1 | 1 | 1 |
| 0 | 1 | 1 | 1 | 1 | 0 | 1 |
| 1 | 1 | 1 | 1 | 0 | 1 | 1 |
| 0 | 1 | 1 | 1 | 0 | 1 | 1 |
| 1 | 1 | 1 | 0 | 0 | 1 | 1 |
| 0 | 1 | 1 | 0 | 0 | 0 | 0 |
| 1 | 1 | 0 | 0 | 0 | 0 | 0 |
| 0 | 1 | 0 | 0 | 0 | 0 | 0 |

FIG. 8B

COMBINATIONAL LOGIC TRUTH TABLE FOR DATA EXTRACTOR WITH SLIP DETECTION

| INPUTS | | | | | | | OUTPUTS | | | |
|---|---|---|---|---|---|---|---|---|---|---|
| NEARSLIPIN | SMPLPOSN_IN | $D_0$ | $D_1$ | $D_2$ | $D_3$ | | SMPLPOSN_OUT | DATA_OUT | NEARSLIPOUT | SLIPOUT |
| 0 | 1 | 0 | 0 | 0 | 0 | | 1 | 0 | 0 | 0 |
| 0 | 0 | 0 | 0 | 0 | 0 | | 0 | 0 | 0 | 0 |
| 0 | 1 | 0 | 0 | 0 | 1 | | 1 | 0 | 0 | 0 |
| 0 | 0 | 0 | 0 | 0 | 1 | | 1 | 0 | 0 | 0 |
| 0 | 1 | 0 | 0 | 1 | 1 | | 1 | 0 | 1 | 0 |
| 0 | 0 | 0 | 0 | 1 | 1 | | 0 | 1 | 1 | 0 |
| 0 | 1 | 0 | 1 | 1 | 1 | | 0 | 1 | 0 | 0 |
| 0 | 0 | 0 | 1 | 1 | 1 | | 1 | 1 | 0 | 0 |
| 0 | 1 | 1 | 1 | 1 | 1 | | 0 | 1 | 0 | 0 |
| 0 | 0 | 1 | 1 | 1 | 1 | | 1 | 1 | 0 | 0 |
| 0 | 1 | 1 | 1 | 1 | 0 | | 1 | 1 | 1 | 0 |
| 0 | 0 | 1 | 1 | 1 | 0 | | 0 | 0 | 1 | 0 |
| 0 | 1 | 1 | 0 | 0 | 0 | | 0 | 0 | 0 | 0 |
| 0 | 0 | 1 | 0 | 0 | 0 | | 0 | 0 | 0 | 0 |

DISTRIBUTED CLOCKING SYSTEM

BACKGROUND OF THE INVENTION

The present invention relates to a distributed clocking mechanism for a distributed synchronous processing system, and more particularly, to a distributed clocking mechanism particularly useful for a distributed digital telephone switching network.

Distributed synchronous processing systems, e.g., those used in large digital telecommunication switching networks, typically require extremely accurate clocking systems to synchronize the various time related operations performed among a plurality of switching stages and their controllers. The clocking signals in such systems generally originate from a centralized clocking source that generates and transmits the clocking signals throughout the system over a dedicated clocking signal transmission network.

Although such clocking schemes are satisfactory for many applications, they suffer from a number of weaknesses. In particular, the reliance on a centralized clocking source leaves a distributed processing system susceptible to system-wide failures in the event of a malfunction in the clocking center. The dependence on a single centralized clock source may be minimized by utilizing a set of redundant clock sources. In such a system, there is a centralized clocking center having a set of clocks that generate and transmit a group of redundant clock signals throughout the network.

A system with this type of arrangement is the International Telephone and Telegraph (I.T.T.) System 12 (now produced by Alcatel). The System 12 uses a pair of reliable clock sources that are distributed by means of a separate clocking signal transmission network comprised of 2 continuous loops (one for each clock source). Each multi-port switch element in the System 12 is coupled to both clock distribution loops and includes a clock selection circuit for selecting one of the two available system clock signals for synchronizing its internal operations. The clock selection circuitry allows a switchover to the alternate clock when a degradation is detected in the currently selected clock signal. This system, however, has experienced problems associated with the distribution of the clocking signals. In particular, since each clock distribution loop is essentially a continuous conductor, a failure in any portion of one of the loops will entirely interrupt the distribution of the associated clock source; thereby leaving the System 12 without an alternate clock signal.

The clock sources in the System 12 must often act as slaves to clock signals derived from external sources such as the national digital network. In such a case, the System 12 is often connected to the national digital network by means of a number of external digital transmission links. Since it is desirable to synchronize to only one of the clock signals associated with these national network digital transmission links at any given time, the System 12 ranks the clock signals of the national network according to the rank of the associated Central Office and the grade of the particular transmission link. The ranking allows the best available clock to be selected for synchronizing the operations of the System 12. The System 12 ranking scheme is implemented in hardware by directly wiring the System 12 clocks to each of the highest ranked clock signals of the national network. As can be seen, the re-ranking of the clock sources in the System 12, as is often required in dynamic switching networks of this type, requires the movement of wires from one national network digital transmission link to another.

Other solutions that have been attempted suffer from similar deficiencies. Elastic buffer arrangements have been utilized to synchronize outgoing transmissions in switch elements having a number of unsynchronized inputs with unaligned phases. The elastic buffers write data into the buffer and read it out of the buffer with two independent clock signals, in order to adjust the unaligned incoming data signals so that the output signals are phase-aligned with one another. Problems in systems utilizing an elastic buffer arrangement have resulted because the two clock signals used to write into and read out of the buffer are not frequency synchronized which can often result in a frame slip (the loss or duplication of an entire frame).

SUMMARY OF THE INVENTION

With the foregoing in mind, it is an object of the invention to provide a reliable clocking system that does not depend on centralized clocking sources.

It is a further object of the invention to provide a clocking system that does not require specialized clock recovery circuitry or elastic buffers for each arriving communications link.

It is a further object of the invention to provide a clocking system that can tolerate multiple clock failures before losing the entire network.

It is a further object of the invention to provide a clocking system that does not require a separate redundant dedicated clocking signal transmission network.

It is a further object of the invention to provide a clocking system that is autonomous and allows for very fast initialization of the clocking system after a system start-up or reset and very fast automatic recovery after a clock failure.

Other objects and advantages of the invention will become apparent in the description which follows.

In the distributed system according to this invention, a distributed clocking system is provided having a plurality of clocks distributed throughout the system for synchronizing distributed digital switching operations. This arrangement provides a number of clocks that can each serve as the system master clock for synchronizing the operations of the entire system. Additionally, each of the clocks not selected as the system master clock is available to serve as a backup master clock in the event of a failure in the active system master clock. Thus, there is no longer a vital centralized clock or group of clocks in the network upon which all operations depend.

In the preferred embodiment of the invention, each of the distributed clocks in the system is ranked according to their stability and accuracy so that the highest ranked operational clock can be selected to serve as the system master clock. Additionally, every clock in the system can operate either as a slave to an external clock (such as the system master clock), wherein the local clock is frequency-locked to the external clock, or alternatively, the clock can operate as a master clock, wherein the local clock is allowed to free-run at its own center frequency (or is locked to a very stable local clock or to the clock signal recovered from the national digital network, when available). Accordingly, a distributed hierarchical master-slave clocking architecture is established. In this manner, the highest ranked clock available to each switch element operates as the master clock, and each of the lower ranked clocks in the system operate as slaves to the master clock while remaining available as backup masters ready to assume the role of master clock in the event of a failure in the active master clock.

According to another feature of the invention, a clock selection mechanism allows the highest ranked clock available at the incoming switch ports to be selected for synchronization. By transmitting the rank of the clock along with the associated data, the clock controller of each switch element will be aware of the clock ranks associated with each of the arriving communications links. In a preferred embodiment, this information is utilized by each clock controller to detect when a higher ranked clock is available, and accordingly, when a switchover to a new master clock is appropriate.

Another aspect of the invention provides for fast and automatic recovery in the event of any type of failure in the system master clock. According to this feature of the invention, when a switch element detects a failure in the transmission of the clock currently being used for synchronization, the switch element will immediately switchover to its own local clock for synchronization. Thereafter, the switch element detecting the failure will transmit the outgoing data synchronized to its own local clock along with its own clock rank and a notification of the detected failure on all of its outgoing communications links to the other switch elements in the system. In this manner, all of the switch elements in the system will eventually be notified of the failure and they will each begin selecting an alternate clock for synchronization. Eventually, the highest ranked clock in the system that is still functional will become the new system master clock for the entire network. If the failure mode was initiated as the result of a failure in a transmission link, rather than a failure in the master clock itself, the original master clock will retain the role of master clock for synchronizing the network operations.

According to a further feature of the invention, a data extraction mechanism recovers all of the data arriving on a plurality of arriving communications links (even in the presence of timing jitter and pulse width distortion) by utilizing the highest ranked clock selected from all of the arriving communications links. In the preferred embodiment of this invention, the data extraction mechanism is combined with a bit slip detector to provide simultaneous detection of a bit slip occurrence (a bit loss or bit duplication) with the data extraction. This allows for the appropriate action to be taken immediately upon the detection of a slipped bit. Additionally, bit-slip protected error correcting encoding is utilized in the clock signalling subchannel that provides for accurate decoding in the presence of single bit slips.

BRIEF DESCRIPTION OF DRAWINGS

A more complete understanding of the present invention may be had by reference to the following Detailed Description with the accompanying drawings, wherein:

FIGS. 4d-1 and 4d-2 are schematic diagrams of a clock subsystem and data extraction mechanism of a switch element;

FIG. 7 is a diagram illustrating the possible alignments of a bit transition with a four phase sampling clock signal and the sampled data values for each case;

FIG. 8a is a table summarizing the possible sampled patterns with the assigned output values for each sampled pattern;

FIG. 8b is a truth table for the five input and two output combinational logic circuit illustrated in FIG. 6;

FIG. 10 is a truth table for the six input and four output combinational logic circuit illustrated in FIG. 9.

DETAILED DESCRIPTION OF THE DRAWINGS

Figure 1:
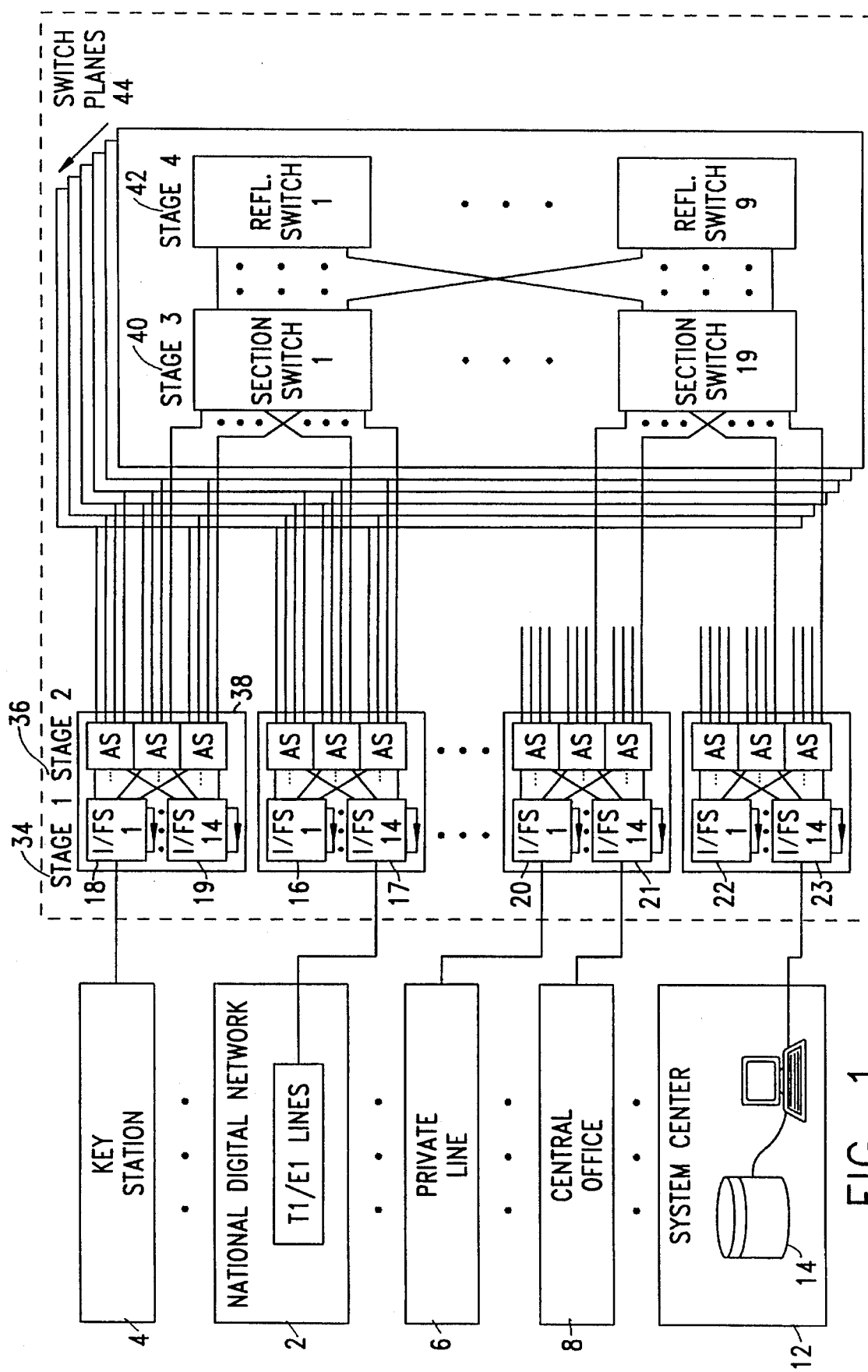
FIG. 1 is a schematic block diagram of a distributed switching network.

An example of a distributed switching network is illustrated in FIG. 1 for interconnecting various types of voice and data equipment. The basic building block of the distributed switching network is the switch element. The switching network is arranged in four stages of switching elements interconnected by a series of communications links, as shown in FIG. 1. The first two stages, referred to as the interface (I/F) stage 34 and the access switch (AS) stage 36, are in terminal units 38 which provide entry to the switch network for the telephone lines and terminal equipment. The third and fourth stages referred to as the section switch (SS) stage 40 and the reflection switch (RS) stage 42 are located on switch planes 44. A more detailed description of the architecture of the switching network is set forth in U.S. Pat. No. 5,255,264 entitled DISTRIBUTED CONTROL SWITCHING NETWORK FOR MULTI-LINE TELEPHONE COMMUNICATIONS (Attorney Docket No. 416-4033). The disclosure of this application is incorporated herein in its entirety by reference.

A switch element, such as those described in the above-referenced application, is the equivalent of a small intelligent switching matrix. Each switch element operates independently and is controlled by a separate processor. In the preferred embodiment, each switch element has nineteen bidirectional switch ports (plus an additional data port). Each port of a switch element contains 32 separate time-division multiplexed (TDM) channels. A multiplexed group of 32 channel time slots constitutes a single frame of data and lasts for a duration of 125 microseconds. Each channel time slot on a communications link constitutes 30 bits of data; therefore, the arriving bit rate is 7.68 Mbps. (8000 frames/second×32 channels/frame×30 bits/channel). Furthermore, each channel has a time slot duration of 3.906 microseconds (125 μsec/32).

The processor associated with each switch element controls circuitry which can switch in space (from one port to another) and can switch in time (from one channel to another). Any of the 32 arriving channels on a communications link, with the exception of channel zero, for any of the 19 switch ports can be connected to any outgoing channel of any port, including the data port. Thus, the switch element is equivalent to a 620 by 620 intelligent switching matrix.

Switch Data Format

Figure 2:
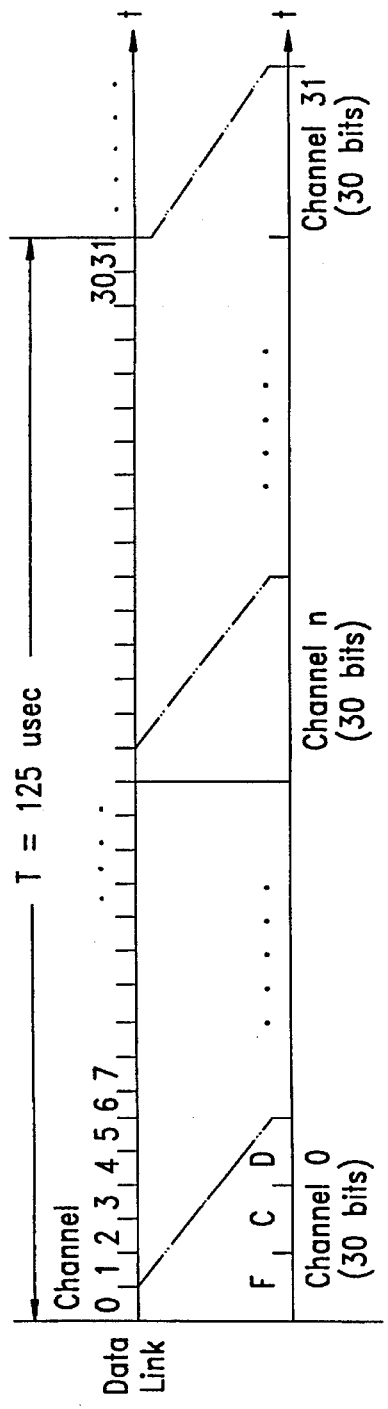
FIG. 2 is a diagram of the data format for a single frame transmission.

The data format for the switch element is illustrated in FIG. 2. As noted, each transmission path carries thirty-two channels (numbered 0 through 31) of time division multiplexed (TDM) digital information in a serial format. One channel (Channel 0) of the 32 channels available in each frame is reserved primarily for broadcasting clocking information throughout the network. As shown in FIG. 2, the 30 bits available in Channel 0 are divided into three subchannels of 10 bits each: for frame synchronization F, clock signalling C and data broadcast D. The information placed in subchannel D is preferably broadcast to every switch element in the entire network. The frame synchronization symbol (1111100000) is used in each switch port to indicate the start of a new frame and is carried over the external communications links connecting the different switch elements.

The data broadcast subchannel D (FIG. 2) is used to broadcast information throughout the system to each switch element. For example, if the system configuration changes, all switch elements must be notified of the change. Accordingly, notification of this change can be placed in the data broadcast subchannel D so that the notice reaches all of the affected switch elements in the network. Thereafter, the affected switch elements can extract this information from the data broadcast subchannel D and update their information accordingly.

The clock signalling subchannel C (FIG. 2) is utilized to transmit the rank of the clock source associated with the arriving data, as well as clock commands for the clock subsystem. As will be discussed below, each clock in the network is ranked according to its accuracy and stability. When a switch element transmits data on its output communications links the switch element will also send (in the clock subchannel C) the rank of the clock source that was utilized for synchronization. Additionally, when a failure is detected in a clock source by a switch element, the appropriate recovery commands will be transmitted to other switch elements by means of the clock subchannel C. The various failure modes and appropriate recovery commands will be discussed in greater detail below.

Figure 3:
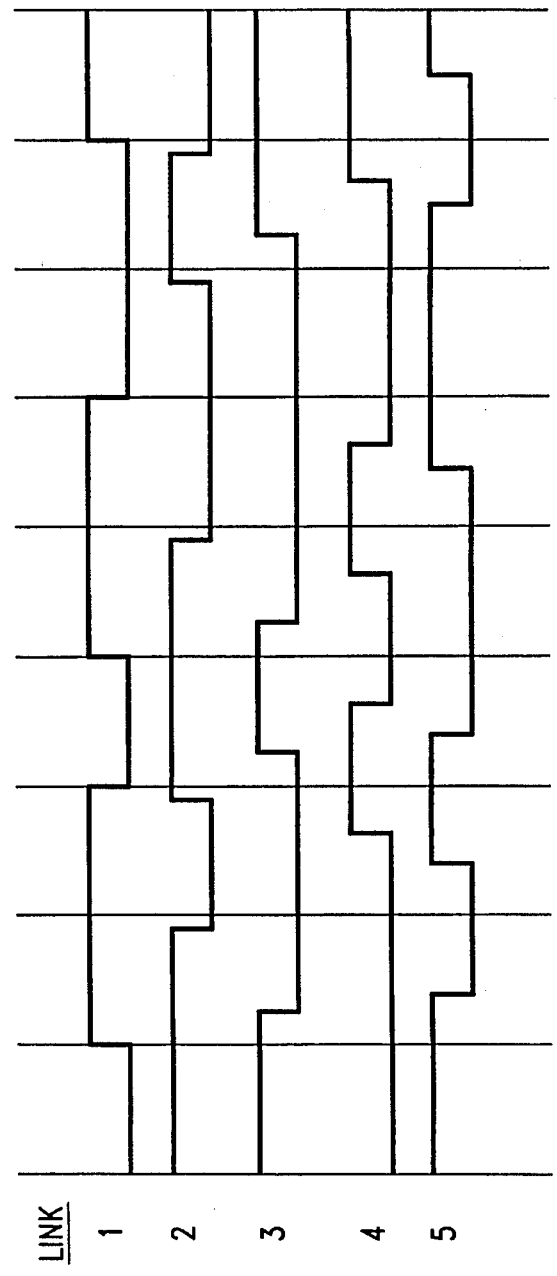
FIG. 3 is a conceptual diagram illustrating the timing of an arriving data stream for five communications links.

Due to the system architecture of the switching network shown in FIG. 1 (as well as in other distributed processing systems), the data arriving on each of the switch ports of the switch elements has originated from a number of different switch elements. Although the data is arriving at the same bit rate (frequency) on each communications link, there is a phase difference between the incoming communications links to a switch element. The phase differences result from, e.g., delays due to the electrical propagation time of the data signals on the communications links and variations between the phases of the clocks on the switch elements transmitting on those communications links. FIG. 3 shows a typical arriving data stream for five communications links, illustrating the non-alignment of the bit transitions on the various communications links.

Figures 4A, 4B, 4C:
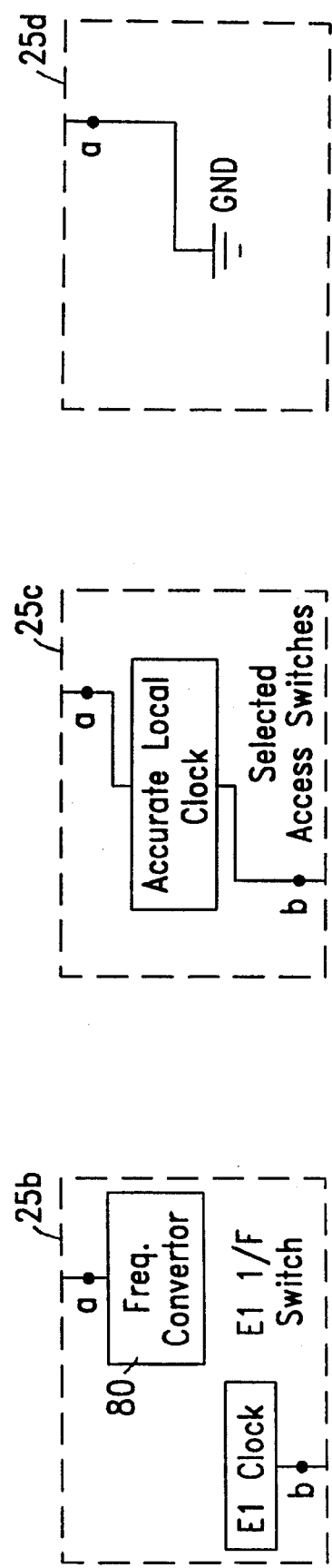
FIGS. 4a, 4b, and 4c are alternate embodiments of the local clock circuitry for the clock subsystem.
Figures 1, 4D:
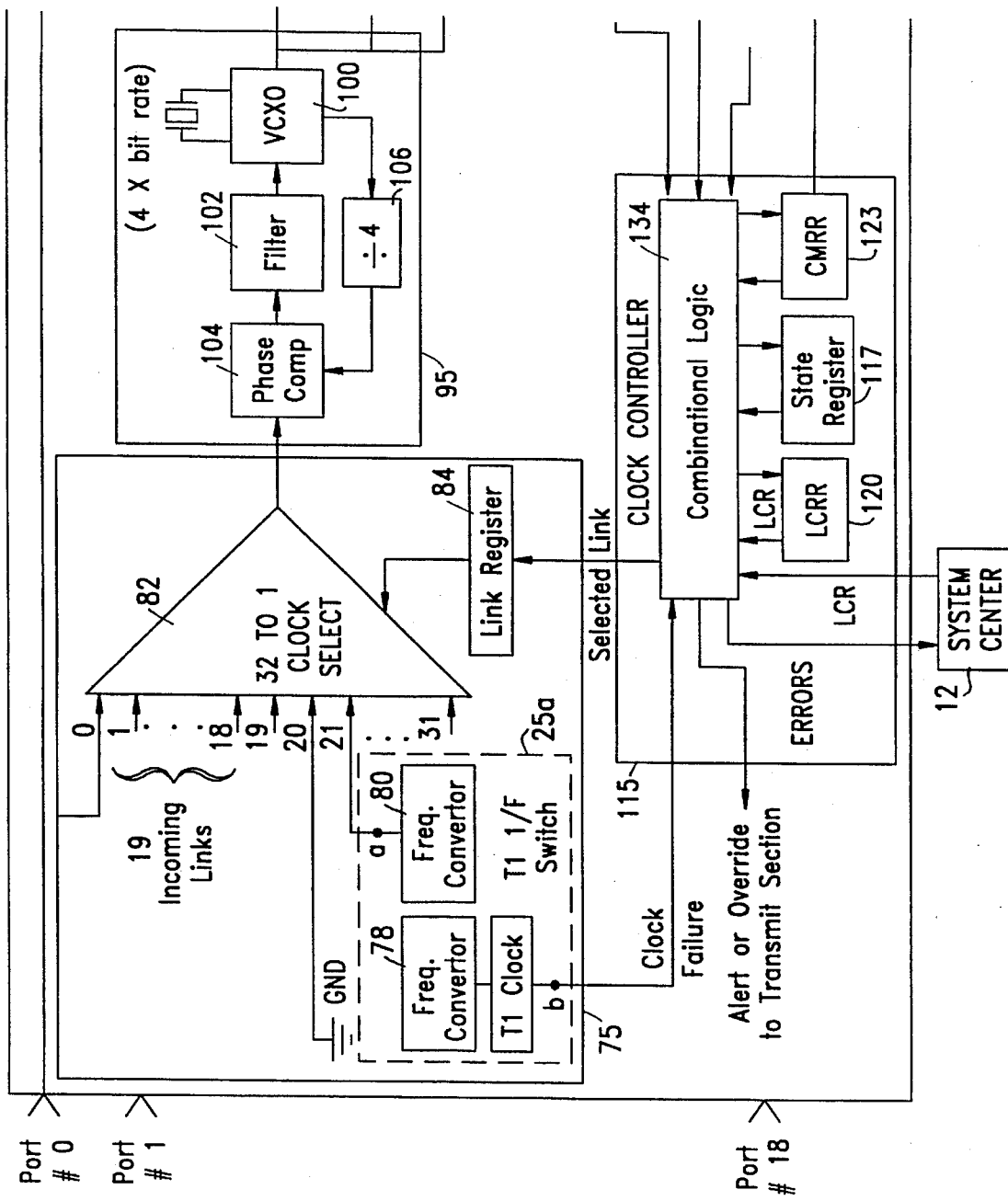

Although the phase differences among the various communications links will stay fixed in time while the network remains in synchronization, and will not shift relative to one another unless a clock, link or switch port fails, the arriving data must be synchronized to a local clock in order for the switching operations to function properly. Accordingly, the clock subsystem, illustrated in FIGS. 4d-1 and 4d-2 are designed to synchronize the data on all of the incoming switch ports to a common clock. In order to operate effectively, the clocking subsystem and data extraction circuitry (in each switch port) must take a set of data inputs and faithfully regenerate them as a set of data outputs with all of the bit-transitions synchronized to the local clock. The data transmitted by a switch element on its output communications links is driven by the local clock and is passed along with the clock rank of the clock to which the local clock is synchronized.

Each switch element in the network contains its own clock subsystem which can operate independently as a free-running master clock or as a slave to some external master clock, where its frequency is locked to the frequency of the master clock.

The preferred clocking subsystem, as shown in FIGS. 4d-1 and 4d-2, include a clock selection circuit 75, a clock recovery circuit 95 as well as a clock controller 115. The clock recovery circuit 95 includes a phase locked loop (PLL) circuit based on a voltage controlled crystal oscillator (VCXO) 100). The PLL circuit allows the clock subsystem to lock onto the phrase of a selected external clock signal arriving at the input of the phase comparator 104 or to free-run at the center frequency of the VCXO 100 when no signal is present at the input of phase comparator 104.

The clocking signals are distributed throughout the switching system by means of the existing communications links connecting the switch elements that normally transmit voice and data signals throughout the switching network. A 4 to 5 encoding scheme (with 5 to 4 decoding) is used to ensure that there is a sufficient 1's density for the phase comparator 104 and the phase locked loop (PLL) circuit to extract and synchronize to the clock. The encoding scheme additionally serves to ensure that the frame synchronization symbol is never duplicated so that frame synchronization capture may be fast and accurate.

System Master Clock

The presence of a clock subsystem on every switch element provides a number of clocks that are capable of serving as master clocks for synchronization. Each of the remaining clocks that are not currently selected as the system master clock can act as slaves to the system master clock, and remain available, in a backup capacity, to take over as the system master clock (SMC) in the event of a failure in the present SMC.

Assigning Ranks

In the preferred embodiment, all of the clock subsystems in the switching network are ranked according to their stability and accuracy so that the best clock available can be selected for synchronization purposes. Similarly, a protocol is established so that in the event of a failure in the system master clock the switchover to a new system master clock is orderly, and all of the clocks in the switching network are not competing to become the new SMC.

In the preferred embodiment of the invention, three of the highest ranked clocks will be selected to serve as master clocks. This group of three master clocks is further ranked (from 3 to 1) where the highest ranked clock (rank 3) is selected to be the system master clock (SMC) for synchronizing the entire network. All of the other clocks in the system will act as slaves to the SMC.

In order to rank the clocks and select the group of master clocks, an assessment must be made of the available clocks so that a subset of potential master clocks may be identified. As will be discussed in greater detail below, the subset of potential master clocks in the preferred embodiment includes the clocks in the interface switch elements 17 that interface with the national digital network 2 (by means of T1/E1 lines) if any, one clock in the system center interface switch 23 as well as one or more switches selected from the access switch stage 36.

After the subset of potential master clocks has been identified, non-identical ranks (from three through one) may be assigned to the three clocks chosen to be the master clocks. The remaining clocks (that are not selected as master clocks) are assigned a rank of 0. The non-identical ranks of the master clocks facilitates the clock selection process by preventing two or more clocks from arriving at a switch element with the same rank.

Master Clocks

When the switching network is linked to the national digital network 2 via T1/E1 lines (FIG. 1), the clocking system of the switching network should operate as a slave to the clock of the national digital network 2. The quality of the timing signals that are extracted from the national T1/E1 lines depend on the rank that is assigned to the corresponding Central Offices (Cos) to which the national lines are connected in the national digital network 2 and the grade of the particular link. Correspondingly, all of the T1/E1 lines that are connected to the switching network will be ranked internally in the switching network. The grade is assigned according to the number of repeaters between the Central Office and the interface switch element.

In such a case, the national T1/E1 lines are connected to the switching network via interface switches 17 (see FIG. 1). These interface switches 17 may be specialized switching elements with configurations that are similar to the generalized switching elements described above. As noted above, the T1/E1 interface switches 17, like any other switch element, has its own local clock subsystem that may be utilized as a master clock. It is preferred that when these T1/E1 interface switches 17 are available in the switching network two of their clocks are selected as part of the group of 3 master clocks. In this case, the system master clock is acting as a slave to the clock of the national digital network 2.

The second choice for the subset of master clocks is the one clock selected from the system center interface switch 23 (see FIG. 1). The system center 12 is used to manage the operations of the switching network including performance of traffic recording functions, logons, and system downloading functions. In the preferred embodiment the clock subsystem in the system center interface switch 23 will always be selected as a master clock (having a rank of at least 1). This allows the system center interface switch clock to act as the temporary system master clock during the initialization of the switching network (until the real system master clock gets its rank assigned by the system center 12 and takes over the control of the clocking).

Finally, when necessary, the master clocks may be selected from any of the clock subsystems located in the access switch stage 36. It should be noted that according to the assignation convention outlined above, the clocks in the access switches will be selected as master clocks only when the network is connected to fewer than two T1/E1 interface switches 17 and there is only one system center interface switch 23. (In the case where there are T1/E1 interface switches 17, the three master clocks will be comprised of up to two clocks selected from the T1/E1 interface switch clocks, and at least one clock will be a system center clock).

Backup Clocks

The remaining clocks that are not selected as one of the three master clocks will be assigned a rank of zero and those meeting the selection criteria outlined above will remain available to serve as backup master clocks in the event of a failure in a master clock. This group of backup clocks contains clocks that were potential master clocks but were not selected. Therefore, a clock subsystem on a T1/E1 interface switch 17 can have a rank of 0 (such as when the network is connected to more than two national T1/E1 lines and only two are selected as master clocks). In the event that one or both of the selected T1/E1 master clocks should fail, the clock audit mechanism of the network, discussed below, will be able to upgrade any one of the backup master clocks from a rank of zero to a nonzero rank, as discussed below.

The rank assignation convention outlined above is preferred for distributed switching networks as described herein, however, it will be appreciated that there are many other ranking conventions that would be equally suitable in most applications.

The local clock ranks should be assigned by the system center 12 during system initialization to each of the switch elements of the switching network. The local clock ranks (LCR) are preferably stored locally in each switch element in a local clock rank register (LCRR) 120 (FIG. 4d-1), a 2-bit register that can be provided in every switch element for this purpose. The value of the local clock rank register 120 is by default zero, and those clocks having non-zero ranks get their ranks downloaded from the system center 12 during initialization. The ranks of the selected switch elements are written into their local clock rank register 120 by means of their clock controller 115. A similar process is also performed when the value of the local clock is dynamically upgraded or downgraded (such as after a failure in a master clock) during system operation, and at regular intervals during normal operation as a safety precaution.

Maintaining a Group of 3 Master Clocks

Once the group of three master clocks is established, it is preferred that the pool of master clocks should always include three clocks. Accordingly, if one or more of the master clocks should fail, the failed clock should be replaced by clocks from the backup pool. If the rank-3 clock should fail, then the rank-2 clock should be upgraded to rank-3, and then a new rank-2 clock should be selected from the set of backup master clocks. Similarly, if the rank-2 clock should fail, a new rank-2 clock should be selected from the list of backup master clocks. In the rare case where both the rank-3 and rank-2 clocks should fail simultaneously, replacements should be selected for both of them from the list of backup master clocks. Preferably, the clock in the system center interface switch 23 will always maintain a rank of 1. The system center 12 maintains a listing of the priority of backup master clocks, to provide for orderly replacement. It should be noted that the upgrading of "failed" clocks should not be immediate, since the failure may temporarily result from a software fault. The loss of the rank-3 clock will cause the automatic resynchronization of the system to the highest ranked clock still available as discussed below.

The above upgrading and replacement functions are performed by the clock audit mechanism found in the system center interface switch 23, which is activated after the detection of the relevant events in the clock subsystem. The detection of failures and the various failure modes associated with the present invention are discussed more fully below.

Selection of Highest Ranked Clock for Synchronization

Figures 2, 4D:
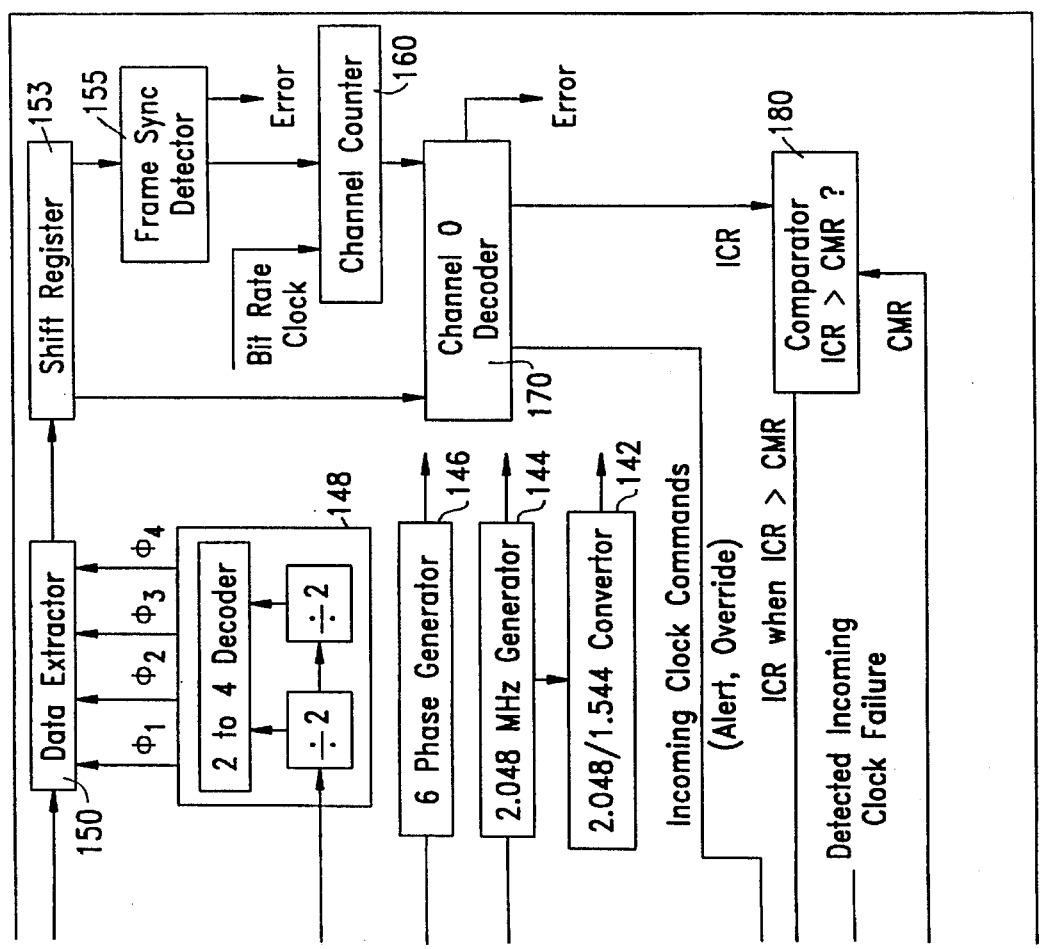

The clock ranking scheme outlined above provides the means for a switch element to select the best clock from among the data signals arriving on each of its many switch ports. As noted, the data signals that arrive at each switch port contain information defining the rank of the clock that was utilized for synchronizing the communications link (this information is contained in the clock subchannel C in Channel 0 of each frame). According to an aspect of the present invention, each switch element monitors the ranks of the arriving clock signals by means of a Channel 0 decoder 170 as shown in FIG. 4. The serial data arriving at each switch port is sampled by means of a data extractor 150 and each data word is placed in parallel form by means of a shift register 153 and presented to the channel 0 decoder 170. The channel 0 decoder 170 is activated during the appropriate time slot by means of the channel counter 160 whose operation is controlled by the frame synchronization detector 155 and a bit rate clock signal. The channel 0 decoder extracts the incoming clock rank (ICR) associated with the arriving data and the clock subsystem commands.

If a higher ranked clock arriving on an incoming communications link is detected by the channel 0 decoder 170 than is currently used for synchronization then the switch element must switch over to the higher ranked clock. This condition is detected by the comparator 180 which constantly compares the value of the incoming clock rank (ICR) derived from Channel 0 with the value of the current master rank (CMR) retrieved from the current master rank register 123. Upon detection of a higher ranked clock, the comparator 180 notifies the clock controller 115 which initiates the clock switchover.

The switchover to a new clock causes the local clock subsystem to lock onto the frequency of the new higher ranked clock (generally the selected clock will be the system master clock having a rank of 3). Eventually, as each switch element selects the arriving clock having the highest rank, the system master clock will become the master of all the switch element clocks in the system.

Clock Selection Mechanism

FIGS. 4d-1 and 4d-2 illustrate the clock signal selection circuit 75 used in every switch element for selecting the clock signal from the incoming switch ports with which the switch element will get synchronized. The signals arriving at each of the switch ports of a switch element are split at the switch port input so that the signal can be evaluated by the clock selection circuitry 75 as well as the data extractor 150. Inputs 0 through 18 of the clock select circuit 82 represent the data stream signals arriving at each of the 19 switch ports of a switch element (an interface switch element will only have 5 switch ports). When one of these inputs (0 through 18) is selected, the local clock acts as a slave to the clock signal arriving on that communications link. Inputs 20 and 21 to the clock select circuit 82 are utilized for special functions. Inputs 19 and 22 through 31 are not utilized in the preferred embodiment and remain available for future expansion.

The clock select circuit 82 selects the input that is indicated by the value stored in the link register 84. The link register 84 stores the index of the incoming communications link that is presently selected as the source of the highest ranked clock presently available to the switch element as defined by the value in the CMRR 123. The value in the link register 84 can have a value between 0 and 31 for each of the inputs to the clock select circuit 82 (as presently embodied, only inputs 0 through 18, 20 and 21 are valid). The value will be between 0 and 18 if the rank of an incoming communications link is maximum; will be 20 after system initialization or reset to allow the local clock subsystem to free-run while searching for a clock source ranked greater than zero; and will be 21 only for the switch selected as the system master clock. As shown in FIGS. 4d-1 and 4d-2, the value of the link register is updated by combinational logic circuitry 134 of the clock controller 115 of the clock subsystem.

Selection of input 20 of the clock select circuit 82 allows the clock recovery circuit 95 to operate in the free-running mode. As shown in FIG. 4d-1, input 20 of clock select circuit 82 is attached to ground (GND), so that when Input 20 is selected the output of the clock select circuit 82 is a ground signal. This ground signal is then applied to the input of the clock recovery circuit 95 shown in FIG. 4d-1. When the input to the phase comparator 104 is zero, the voltage controlled crystal oscillator (VCXO) 100 free-runs by oscillating at its center frequency. In the preferred embodiment, the VCXO 100 will oscillate at four times the arriving bit rate, i.e., 30.72 Mbps (4×7.68 Mbps).

Input 21 to clock select circuit 82 will only be selected in the system master clock switch element. There are three alternative configurations for the local clock circuit 25 connected to input 21, as illustrated in FIGS. 4a, 4b, and 4c. The type of switch element under consideration will determine which embodiment is utilized for the connection made to input 21 of clock select 82.

If the switch element is a T1 interface switch, connected to a national T1 line, the local switch element's clock subsystem will be synchronized to the clock signal that is extracted from the T1 line. As shown in FIG. 4d-1, in a T1 interface switch, input 21 of clock select circuit 82 is connected to local clock circuitry 25a. The local clock circuitry 25a takes the 1.544 MHz T1 clock signal extracted from the national T1 line and converts it to a 2.048 MHz clock signal by means of frequency conversion circuit 78. Thereafter, the frequency of this clock signal is further converted to 3.84 MHz by frequency convertor 80. The frequency convertors 78,80 perform standard frequency conversion by means of phase-locked loop circuitry. The 3.84 MHz output of the frequency convertor 80 is coupled to input 21 of clock select circuit 82. It should be noted that a clock signal oscillating at a frequency of 3.84 MHz (with a high and low data value in each clock period) is equivalent to a bit stream data rate of 7.68 Mbps (3.84×2). If an error is detected in the T1 clock, the local clock controller 115 will be notified via the clock failure output of local clock circuit 25a.

If the switch element is an E1 interface switch, connected to a national E1 line (in Europe), the local switch element's clock subsystem will be synchronized to the clock signal that is extracted from the E1 line. In a E1 interface switch, input 21 of clock select circuit 82 is connected to local clock circuitry 25b, shown in FIG. 4a. The local clock circuitry 25b converts the 2.048 MHz E1 clock signal extracted from the national E1 line into a 3.84 MHz signal by means of frequency convertor 80. The frequency convertor 80 performs standard frequency conversion by means of phase locked loop circuitry. The 3.84 MHz output of the frequency convertor 80 is coupled to input 21 of clock select circuit 82. If an error is detected in the E1 clock, the local clock controller 115 will be notified via the clock failure output of local clock circuit 25b.

If the switch element is an access switch selected to operate as a master clock (according to the criteria outlined above), the local switch element's clock subsystem will be synchronized to an extremely accurate and stable local clock (±25 parts per million). As shown in FIG. 4b, in a selected access switch, input 21 of clock select circuit 82 is connected to local clock circuitry 25c. The local clock circuitry 25c is comprised of an extremely accurate and stable local clock that oscillates at a center frequency of 3.84 MHz. The 3.84 MHz output of the local clock circuitry 25c is coupled to input 21 of clock select circuit 82. If an error is detected in the local accurate clock, the local clock controller 115 will be notified via the clock failure output of local clock circuit 25c.

In all other switch elements (i.e., those that are not T1 or E1 interface switches or selected access switches), the local switch element's clock recovery circuit 95 (FIG. 4d-1) will be allowed to free-run when synchronizing the operations of the switching network. As shown in FIG. 4c, in these switch elements the local clock circuit 25d is a connection to ground. Thus, input 21 to clock select circuit 82 is wired to ground (GND). The output of the clock select circuit 82 when input 21 is selected in this case is a ground signal. This ground signal is then applied to the input of the clock recovery circuit 95 shown in FIG. 4d-1. When the input to the phase comparator 104 is zero, the voltage controlled crystal oscillator (VCXO) 100 can free-run by oscillating at its center frequency (±50 parts per million), as discussed more fully below. In the local clock circuit configuration of FIG. 4c, there are no clock failures associated with the local clock circuit 25d (since there are is no clock in the local clock circuit 25d). Thus, the clock failure output from the local clock circuitry has been eliminated.

Operation of the Clock Recovery Circuit

The clock recovery circuit 95 is designed to minimize the phase difference between the two signals applied to the phase comparator 104 (the input signal from the clock selection circuit 75 and the signal from the VCXO 100). Thus, the phase of the VCXO 100 will be locked to the phase of the input signal and will follow any variations in the input phase. The phase comparator 104 compares the two inputs and outputs a DC level that is filtered by filter 102 and then used to control the frequency of the VCXO 100. One input to the phase comparator 104 is the data signal selected by the clock selection circuit 75. The second input to the phase comparator 104 is the clock signal derived from the VCXO 100. Before being input to the phase comparator 104 the VCXO signal is divided by a factor of 4 by the divide-by-four circuitry 106 in order for its frequency to be four times the bit rate of the first input (since the center frequency of the VCXO equals 4 times the arriving bit rate). The DC output of the phase comparator 104 causes a minor adjustment in the actual frequency of the VCXO 100 that serves to reduce the phase error.

In cases where there is no input signal to the phase comparator 104 (i.e., when clock select circuit 82 is selecting a grounded input) the output of the clock recovery circuit 95 will be the nominal center frequency of VCXO 100.

Timing Signals

Figure 5A:
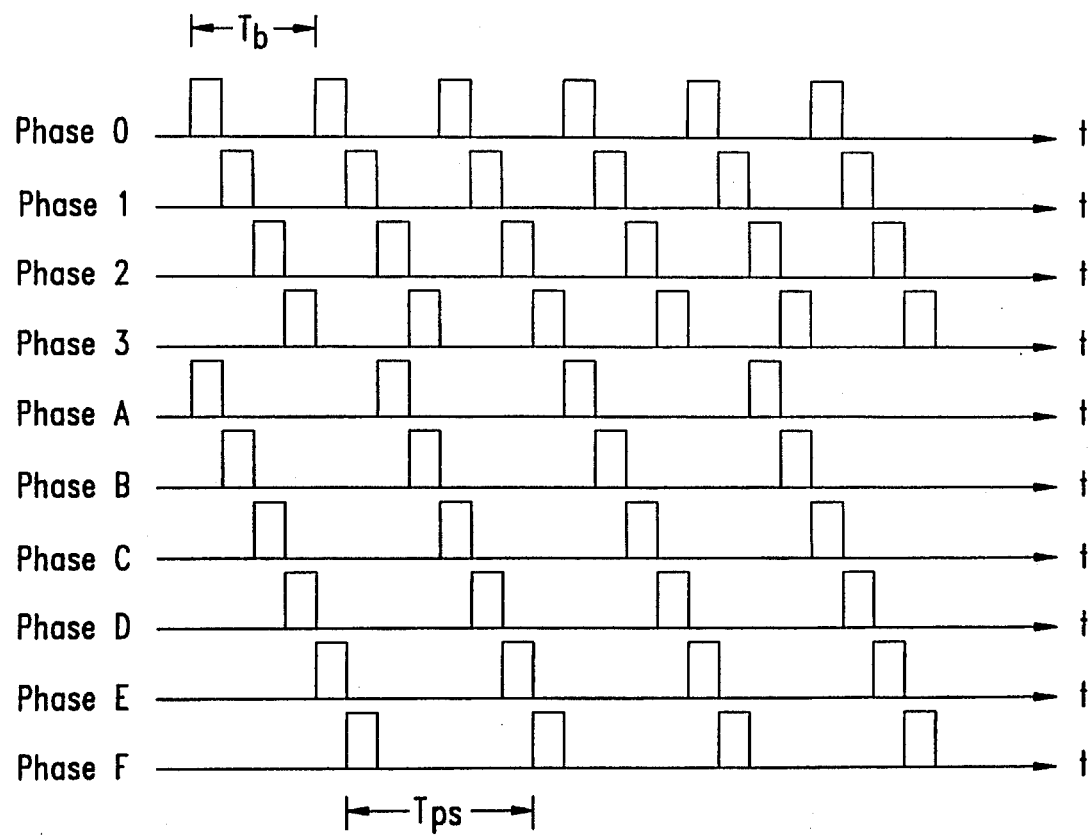
FIG. 5a is a time plot of a four phase clock signal and a six phase clock signal.

The clock signal obtained at the output of the clock recovery circuit 95 is then converted to the various clock signals that are necessary for the operations of the switch element. For example, a four phase signal is generated by the four phase signal generator 148 and utilized by the data extractor 150 associated with each incoming communications link to sample the arriving data and synchronize the data transmission on the outgoing communications links. In order to sample the 30 arriving bits in each channel time slot (3.906 μsec duration), the four phase clock signals (Phases 0–3) must have a period, $T_b$, (bit duration) of 130.2 nsec (3.906 μsec/30), as shown in FIG. 5a.

Figure 5B:
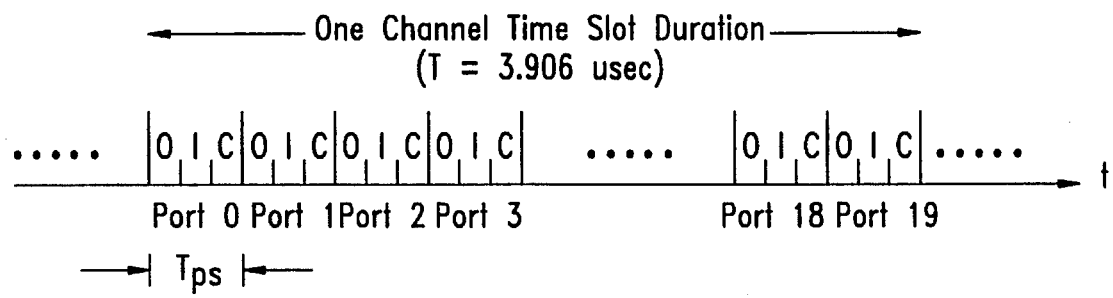
FIG. 5b is a time plot illustrating one channel time slot wherein each channel duration is comprised of twenty port time slots.

In addition to the four phase clock (used in the data sampling process) there is also a six phase clocking signal utilized for the switching and transmission operations performed in each switch port. Since each switch element has twenty ports of data to be processed in each channel time slot (3.906 μsec duration), the six phase clock signals (Phases A–F) utilized for accessing each port must have a period, $T_{PS}$, (port time slot) of 195.3 nsec (3.906 μsec/20), as shown in FIG. 5a. Each port time slot is additionally divided into six phase periods by a six-phase signal generator 146 (see FIG. 4d-2). As shown in FIG. 5b, each port time slot, $T_{PS}$, has slots allocated for outgoing data (O), incoming data (I), and controller access (C). During each port time slot, $T_{PS}$, two bus phase times (Phases A and B) are used to handle outgoing data (slot O) by transferring out an outgoing channel word from a memory location to its switch port temporary register. During this outgoing time slot O (Phases A and B of the six phase clock), the memory location allocated to the respective switch port and channel are read. Similarly, two bus phase times (Phases C and D) are used to handle incoming data (slot I) by transferring an incoming channel word to its destination memory location. During this outgoing time slot I (Phases C and D of the six phase clock), the memory location allocated to the respective port and channel are written into. The final two bus phase times (Phases E and F) corresponding to slot C are reserved for data transfers between the controller interface and the switchport.

Additionally, as shown in FIG. 4d-2, a 2.048 MHz clock signal is generated by a 2.048 MHz generator 144. In a T1 interface switch, a 1.544 MHz clock signal is generated by a 2.048 MHz to 1.544 MHz frequency convertor 142. These clock signals are used for various operations in the switch elements.

Clock Controller Operation

The clock controller 115, shown in FIG. 4d-1, is a finite state machine (FSM) in each switch element that controls the transition between various states of the clocking subsystem. The state of the clock controller 115 is determined by the values stored in its various registers, as well as other events. The state register 117 contains the current state of the clock controller 115. The various states that may be stored in the state register include: Local, Slave, Master, Alert, Override and Failure. Each state is discussed in detail below.

The local clock rank register (LCRR) 120 contains the local clock rank (LCR) of the local clock. This value is by default zero, and in clocks selected to serve as master clocks the rank is assigned by the system center 12 and written into the LCRR 120 via the clock controller 115 at system initialization or when the local clock rank is upgraded or downgraded by the system center 12 during system operation. The current master rank register (CMRR) 123 contains the rank of the current clock being utilized by the switch element for synchronization and has a value between 0 and 3. As seen in FIG. 4d-2, the value stored in the CMRR 123 is updated by the combinational logic 134 of clock controller 115 whenever a new master clock is selected for synchronization.

Clock Controller States

In the clock controller's LOCAL state, the local clock is in a free-running mode oscillating at the center frequency of the VCXO 100. This is the initial state of all the switches in the system, immediately after initialization or reset. The local switch is placed in the LOCAL state by the clock controller 115 by setting the value of the link register 84 equal to 20. When the value of the link register 84 is 20, the clock select circuit 82 will select input 20 allowing the local clock subsystem to free run without being locked to an external frequency. The current master rank in the LOCAL state will be equal to the default local rank of 0. This default rank value will be maintained until the actual clock rank of the switch element is assigned by the system center 12.

In the clock controller's SLAVE state, the local clock is synchronized to the incoming clock specified by the value of the link register 84 (having a value between 0 and 18). The current rank of the clock selected for synchronization is between 1 and 3 (the rank of the selected incoming communications link extracted from its clock subchannel). The local clock rank is between 0 and 2; (this is the normal operating state of all of the switches in the system with the exception of the rank 3 switch generating the system master clock).

In the MASTER state, the local clock subsystem is either synchronized to the T1/E1 clock for T1/E1 interface switches, as shown in FIGS. 4 and 4a respectively, to an accurate local clock for selected access switches, as shown in FIG. 4b, or is free-running, as shown in FIG. 4c. When the local clock is selected as the system master clock, the value in the link register 84 is 21. The current rank of the system master clock equals the local rank of the clock, which has a value between 1 and 3 (likely 3). A switch enters the MASTER state by setting the status register 117 to MASTER; setting the value of the link register 84 to 21; setting the value of the current master rank register (CMRR) 123 to equal its own clock rank (retrieved from the Local Clock Rank Register 120); and finally inserting the rank from the CMRR 123 into the clock subchannel C for all outgoing communications links.

The ALERT state of the clock controller 115 is initiated by the first switch that detects a failure in the clock signal currently selected for synchronization. (The failures that are likely to be detected include an idle line or a framing error, discussed further below). Upon detecting an error, the initiating switch selects its own local free-running clock as the master clock by setting the value of its link register 84 equal to 20, and the value of the current master rank equal to its local rank (by setting the value in the CMRR 123 to its local rank from the LCRR 120). Thereafter, the initiating switch sends out its local clock signal over all of its outgoing communications links, together with the local rank and a command in the clock subchannel C of channel 0 to indicate the ALERT status to the other switches in the network.

If the value of the local clock rank register 120 in the switch initiating the ALERT state is 0, (which is the case for most switches), the switch enters the ALERT state and becomes a temporary master clock. However, if the initiating switch is a valid master clock, having a local non-zero rank between 1 and 3, the valid master clock will enter the OVERRIDE state, discussed below.

When regular switches (non-master switches), in the SLAVE state, detect an ALERT command on an incoming communications link by extracting the Channel 0 commands via channel 0 decoder 170, they will also enter into the ALERT state. The receiving switches will each then synchronize their local clocks to the incoming clock signal that is associated with the ALERT command. The ALERT command tells a switch element that receives the command to start synchronizing to an alternate clock. If the ALERT command is received on more than one input at a given time, then any one of these inputs can be selected as the clock signal source. A switch enters the ALERT state by setting the value of its state register 117 to ALERT; setting the value of the link register 84 to equal the number of the arriving communications link associated with the ALERT command; storing the value of the rank of the arriving communications link associated with the ALERT command into the current master rank register (CMRR) 123; and finally inserting the ALERT command and the value from the current master rank register (CMRR) 123 into the clock subchannel C for all outgoing communications links.

If two or more regular switches detect a failure in the incoming clock signal selected for synchronization simultaneously, they will all initiate an ALERT command and the system will have two temporary master clocks having a rank of 0. The system will remain in this state only for a short duration until a valid master clock (having a rank between 1 and 3) receives the ALERT command.

The system returns to its normal operating state once a valid master clock switch receives the ALERT command on an incoming communications link, and gets localized. A master clock switch gets localized after receiving the ALERT command by selecting its own local clock as the master and sending its clock signal out over the outgoing communications links, together with its own rank and an OVERRIDE command.

Regular switches (non-masters) in the ALERT state receiving the OVERRIDE command on their incoming communications links will go into the OVERRIDE state. In this state, the local clocks get synchronized to the incoming clock associated with the OVERRIDE command, and sends the clock signal out together with the incoming clock rank and the OVERRIDE command. The switches which are already in the OVERRIDE state when they receive a new OVERRIDE command will ignore the new incoming OVERRIDE commands. A switch enters the OVERRIDE state by setting the value of the state register 117 to the OVERRIDE state; setting the value of the link register 84 to the incoming communications link associated with the OVERRIDE command; setting the value of the current master rank register (CMRR) 123 to equal the value of the rank of the incoming communications link associated with the OVERRIDE command; and finally, inserting the OVERRIDE command and the value in the CMRR 123 into the clock subchannel C for all outgoing communications links. After a reasonable time-out period has expired, measured by clock controller 115, each of the switches that are in the OVERRIDE state will return to the normal operating state (i.e., the SLAVE state).

If a switch is already in the ALERT or OVERRIDE state and another ALERT command is received, the new ALERT command should be ignored by the receiving switch. If the current SMC (whose status register 117 is set to the MASTER state) receives an ALERT command, then the SMC should insert an OVERRIDE command and the SMC rank (from the CMRR) into the clock subchannel C for all of the outgoing communications links.

The clock controller's FAILURE state is only relevant for the clock audit mechanism found in the system center interface switch 23. Any T1/E1 or local clock failure detected locally will determine the transition into the FAILURE state, where the ultimate action to be taken is the replacement of the switch element. The immediate action taken is to disable all outgoing links, thus triggering ALERT commands by the switch elements connected to the failed switch element. In this manner, alternate links are selected by subsequent switch elements in the network. The various failure modes are discussed below.

Clock Controller Operation at System or Switch Reset

After a system power-on or reset, (e.g., at system start-up or after the insertion of a repaired switch) the state register 117, local clock rank register 120, and current master rank register 123 in the clock subsystem are cleared. Similarly, after a single switch power-on or reset, the same registers in that local switch are cleared. However, after a power-on or reset, the value of the link register 84 in each switch equals 20. Thus, the switches will start in the LOCAL state with their local clocks in a free-running mode.

After a system power-on or reset, the system center interface switch 23 receives its assigned clock rank of 1 from the system center 12, and this value is stored into its respective local clock rank register (LCRR) 120. Upon reset or start-up, the first system center interface switch 23 goes into the MASTER state and sends out its clock to the neighboring switch elements. Any switch that receives the clock from the first system center interface switch will detect that this is a higher ranked clock and the receiving switch goes into the SLAVE state, where the receiving switch element synchronizes itself to the received clock signal, as discussed above.

Once the higher rank of the arriving system center clock is detected at a switch port by the comparator 180, (i.e., the incoming clock rank is greater than the current master rank) the local clock gets synchronized to the higher ranked clock. In such case, the switchover is initiated by storing the Incoming Clock Rank (ICR) from the channel 0 decoder 170 in the current master rank register (CMRR) 123; updating the value of the link register 84 (FIG. 4) to equal the value of the incoming communications link on which the higher ranked clock is detected (between 0 and 18); setting the status of the state register 117 to the SLAVE state; and finally, inserting the rank of the selected clock into the clock signalling subchannel C for all outgoing communications links (by storing the contents of CMRR 123 into the registers provided in all the switch ports for this purpose).

When the switch elements selected as master clocks receive their local clock ranks (having values greater than zero), they are stored into the Local Clock Rank Registers (LCRRs) 120. If the local clock rank value is greater than the current value stored in the current master rank register (CMRR) 123 (i.e., in the master switch elements), then the local clock becomes the system master clock. The local clock becomes the system master clock by setting the value of the state register 117 to MASTER; setting the value of the current master rank register (CMRR) 123 equal to its own new local clock rank (LCR); setting the value of the link register 84 equal to 21 so that Input 21 of clock select circuit 82 is selected; and inserting its own rank into the clock signalling subchannel C for outgoing communications links.

Once the new system master clock is activated and has started to send its clock signal out over its outgoing communications links, the other switches which have been synchronized to other clocks will detect that a higher ranked clock is arriving on its input ports and they will respond by getting synchronized to this higher ranked clock. If a switch that is selecting this new clock for synchronization was previously in the MASTER state, the switch element will be converted to the SLAVE state.

Failure Modes

When a clock in a switch element fails the respective switch element will be unable to function. As a result, all of the outgoing switch ports of the respective switch element will be idle. This idle condition will be detected by the neighboring switch elements that are linked to the failed switch element. If the switch element detecting the idle condition on one of its switch ports had been utilizing the signal associated with that link for synchronization, the detecting switch element will enter the ALERT state. If the idle link had not been utilized for synchronization the detecting switch element will merely notify the clock audit mechanism (found in the system center interface switch 23) of the failure.

After receiving an ALERT command, the clock controller 115 in each of the master clock switches will send a message to the clock audit mechanism (located in the system center interface switch 23) indicating that the master clock is "alive". The clock audit mechanism will receive three "alive" messages in a short period if all three of the master clocks are still functioning. Therefore, less than three "alive" messages received by the clock audit mechanism indicates a failure in the respective (silent) master clock switch.

A failure in the incoming clock signal currently selected for synchronization is detected at the respective switch port. An error is detected, e.g., when the frame synchronization symbol in subchannel F on an arriving communications link cannot be decoded by the Channel 0 decoder 170 for a number of successive frames due to transmission errors, when 10 successive ones or zeros are detected ("stuck at" error), when parity errors are detected, when there is a loss of frame synchronization and/or an idle condition on the incoming communications link. The switch detecting the failure enters the ALERT state, as outlined above.

The necessary upgrading and downgrading of failed clocks is performed by the clock audit mechanism found in the system center interface switch 23. The clock audit mechanism polls the rank 3 and rank 2 clocks sources on a periodic basis to confirm their rank and obtain their status. After a fault detection, or due to manual intervention, the clock audit mechanism will change the clock source selection or ranking.

After detection of a failure in the rank 3 or rank 2 clock sources the clock audit mechanism will wait a period before initiating the upgrading of clocks from the backup pool. The waiting period allows the clock audit mechanism to determine if the failure was improperly initiated by a software fault or if the "failed" rank 3 clock will be reloaded during the waiting period before the rank 2 clock needs to be upgraded to rank 3.

The clock in the system center interface switch 23 should always maintain a rank of 1. In the event of a failure in this clock, there will be no upgrading. During this period, the network will be operating with only a rank 3 and a rank 2 clock, until the system center is again operational.

After a system power loss, the network will operate on backup power until the primary power source is restored. If the primary source is not restored until after all of the backup batteries have drained, then the data stored in the system will be lost. In this case, a complete system restart will be required.

As may be appreciated from the above discussion, the recovery algorithm to overcome a failure does not depend on the type or location of the clock failure. This is accomplished, in part, by storing the information that is necessary to select a new clock locally in each switch. Registers in each switch store the value of the current SMC rank (in the CMRR 123), the value of the local clock rank (in the LCRR 120), and the index (having a value between 1 and 18) of the incoming communications link that is carrying the SMC signal into the switch in the link register 84. This is the only information needed by a switch to enter the ALERT state and select a new link for synchronization upon detection of an error.

Data Extraction

Figure 6:
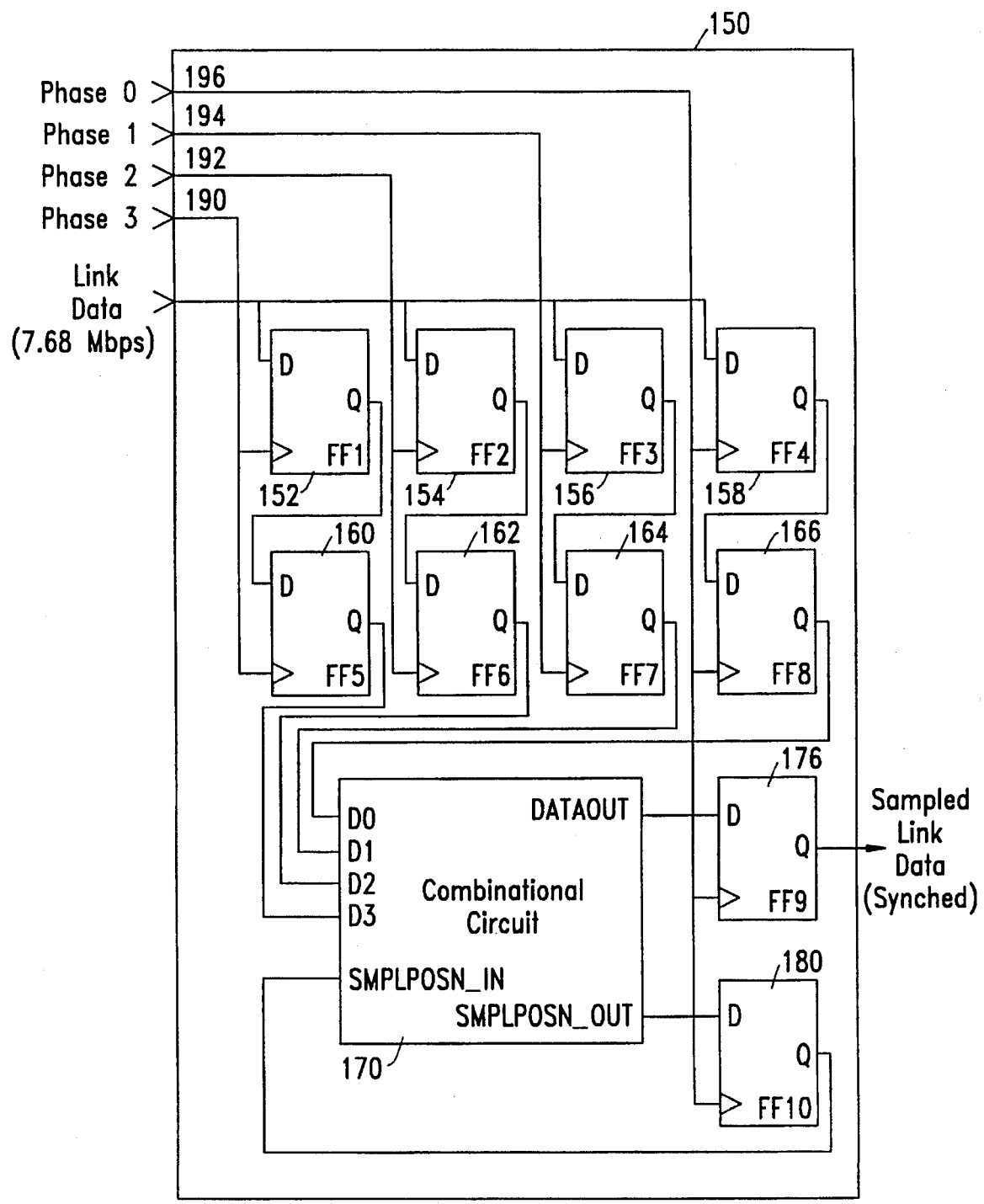
FIG. 6 is a schematic diagram of a data extraction circuit.

To properly ascertain the value of each incoming bit, each communications link is sampled at a rate of four times the bit rate. As shown in FIG. 4, the data arrives at each switch port and is sampled by the data extractor 150. The four samples are obtained and evaluated by the data extractor circuitry 150 to determine what logic value the bit has. A separate data extractor circuit 150 is required for each of the arriving communications links. As illustrated in FIG. 6, the sampling operation is performed by a group of four positive edge-triggered D-type flip-flops 152, 154, 156, 158 which are clocked by a four-phase clocking signal from inputs 190, 192, 194, 196, respectively. As discussed above, the waveforms of the four-phase clock can be generated by the four phase generator circuit 148, shown in FIG. 4d-2, using the clock signal derived from the clock recovery circuitry 95. Alternatively, the four-phase clock can be generated using a ring counter circuit. The four phase clock signals each have a frequency that equals the bit rate (i.e., 7.68 MBps in the preferred embodiment), however each of the four clock phase signals are out of phase by a difference of one-fourth the bit duration. The rising edge of each phase is sequenced such that phase 0, then phase 1, then phase 2, and finally phase 3 occur in this fashion repetitively, as shown in FIG. 5a. This allows the bits to be sampled four times during each bit duration.

The sampling circuitry for each incoming communications link is illustrated in FIG. 6. As seen in the figure, the D inputs of the first bank of Flip-Flops 152, 154, 156, 158 are connected to the link data input. The four flip-flops 152, 154, 156, 158 are clocked by Phase 3, Phase 2, Phase 1, and Phase 0 of the four-phase clock respectively. As is known in the art, the output of a positive edge-triggered D-type Flip-Flop changes only on the rising edge of its clock signal. After the four flip-flops 152, 154, 156, 158 have captured the samples, the Q outputs of these flip-flops are sent to a second bank of flip-flops 160, 162, 164, 166 which are clocked to the same phases that the first bank of flip-flops are clocked with. The purpose of the second bank of flip-flops 160, 162, 164, 166 is to minimize any metastability problems that may occur in the first bank of flip-flops 152, 154, 156, 158 that result from the flip-flops capturing the sample during a bit transition. In the preferred embodiment, the clock rate applied to each of the flip-flops allows the first bank of flip-flops enough time to settle to a stable state. The probability that the second bank of flip-flops will have their setup and hold times violated is extremely low, thus the probability of a metastable state propagating past the second bank of flip-flops is negligible.

The output of the second bank of flip-flops 160, 162, 164, 166 is now essentially a metastable-free sampling of the incoming communications link at four times the bit rate. Since the phase relationship between the local clock and the incoming data is unknown, the sampling at the output of the second bank of flip-flops 160, 162, 164, 166 is not relative to the start of a bit. The four samples, therefore, may represent a sampling across two adjacent bits. The four samples from the Q outputs of the second bank of flip-flops are then passed to a combinational circuit 170 for a determination as to what the logical bit value for this set of samples should be.

FIG. 7 illustrates the possible relative positions of the bit transition and the four-phase clock, as well as the states that the four flip-flop samples may take for such a sample. The vertical lines 202, 204, 206, 208 in FIG. 7 represent the 4 sampling points performed by the flip-flop banks. The waveforms represent an incoming bit transition on a communications link. The binary patterns under the heading "Flip-Flop Values" represent the values that the flip-flops will settle to for each case (under normal operating conditions of matched frequency and no bit errors). Note that Cases 2, 4, 6, 8, 10, 12, 14 and 16 all have two possible states. The two possible states result from the incoming data being sampled at the transition edge of the bit by one of the Flip-Flops, which is influenced by any timing jitter appearing on the communications link. The affected flip-flop will randomly settle to one of the stable states after a sufficient period of time.

Although the waveforms of FIG. 7 are shown with the transition edges occurring exactly at the sampling points of the four-phase clock, this will rarely occur. However, as long as the incoming data transitions occur within the setup and hold time window of the flip-flops, they may be analyzed as if the edges lined up with the sampling clock edges.

In cases where the majority of the four samples are ones (cases 1, 2, 3, 15 and 16), the logic of the combinational circuit 170, shown in FIG. 6, is designed to determine that the incoming bit is a one. Similarly, in cases where the majority of the four samples are zeros (cases 7, 8, 9, 10 and 11 of FIG. 7), the logic of the combinational circuit 170 is designed to determine that the incoming bit is a zero. The remaining cases (cases 4, 5, 6, 12, 13 and 14 having "Flip-Flop Values" of 1100 or 0011) where there are an equal number of ones and zeros require special consideration when determining what binary value to assign to the incoming bit. In such cases, the previous history of the samples must be known in order to assign a value to the sampled pattern. If the data has been sampled using the early part of the sample then the early part of the sample should continue to be used (i.e., if the signal has been sampled using the early part of the samples, and a new sample of 1100 is detected then the early part of this sample should be used and a value of 1 assigned to the bit. On the other hand, if the late part of the sample has been used, a value of 0 should be assigned). In the preferred embodiment, the history of whether the signal is sampled at the early or late part of the bit is recorded as the SMPLPOSN_OUT signal (sample position) stored in Flip Flop FF10 illustrated in FIG. 6. The SMPLPOSN_OUT signal, from combinational circuit 170, indicates whether the "early" or "late" part of the sample was chosen as the output data bit value. The value of the SMPLPOSN_OUT signal is stored in FF10 (FIG. 6), at the same time that the output bit value for the four sample pattern is stored in flip-flop FF9 (with the rising edge of Phase 0). On the next clock pulse, the value of the SMPLPOSN_OUT signal stored in flip-flop FF10 will appear at the SMPLPOSN_IN input to the combinational circuit 170.

By convention, the logic of the combinational circuit 170 is such that if the "early" part of a sample is selected the SMPLPOSN_OUT signal will have a value of 1. Conversely, if the "late" part of the sample is selected then the SMPLPOSN_OUT signal will have a value of 0. FIG. 8a summarizes the eight possible "Flip-Flop Value" sampled patterns (under normal operating conditions) and illustrates the cases from FIG. 7 that are associated with each pattern. The assigned data output bit value is a function of the four sample pattern and the previous value (i.e. one clock cycle earlier) of the SMPLPOSN_OUT signal. As seen in FIG. 8a, patterns 1, 2 and 8, having a majority of zeros, will have output data bit values of zero; and patterns 4, 5 and 6, having a majority of ones, will have output data bit values of one. Further, it will be noted that the zeros of pattern 2 occur in the "early" part of the pattern. Thus, by convention this pattern will be assigned a SMPLPOSN_OUT signal value of 1 by the combinational circuit 170. Similarly, the zeros of pattern 8 occur in the "late" part of the pattern. Thus, pattern 8 will be assigned a SMPLPOSN_OUT signal value of 0. Pattern 1 is comprised of all zeros and does not give an indication as to which side of the pattern was used to make the decision, hence, the previous value of the SMPLPOSN_OUT signal will be assigned whenever this pattern is detected (SMPLPOSN_OUT=SMPLPOSN_IN). The values of the SMPLPOSN_OUT signal follow the same convention for the patterns that have output data bit values of one (patterns 4, 5 and 6) as shown in FIG. 8a.

The patterns in FIG. 8a having an equal number of zeros and ones (patterns 3 and 7) require special consideration (indicated in the figure by SC). They must utilize the value of the SMPLPOSN_OUT signal in determining the output bit value. If the previous state of the SMPLPOSN_OUT signal was a one, then the "early" part of the signal was utilized in determining the previous output bit value and hence the early pattern must now be used to make the decision for an output data bit value. Similarly, if the previous state of the SMPLPOSN_OUT signal was a zero, then the "late" part of the pattern must be used to make the decision for an output data bit value. The SMPLPOSN-OUT signal appears at the input to the combinational circuit of FIG. 6 as SMPLPOSN_IN with the next rising edge of Phase 0 of the four-phase clock signal. In the case of pattern 3 of FIG. 8a, the output data bit value (at the output of flip-flop 176) will have a value of zero if the SMPLPOSN_IN signal entering the combinational circuit 170 with the four sample pattern has a value of one, and has a value of one if the value of SMPLPOSN_IN is zero. Similarly, for pattern 7, if the value of SMPLPOSN_IN (based on the previous value of the SMPLPOSN_OUT signal) is one then the output bit value will be a one. Likewise, if the value of SMPLPOSN_IN is a zero, then the output data bit value will be zero.

The resulting outputs for each combination of the four sample patterns and the two possible values of the SMPLPOSN_OUT signal are summarized in FIG. 8b. The truth table of FIG. 8b is implemented as the logic of the combinational circuit 170 in FIG. 6.

Unexpected four bit sample patterns (those other than the ones listed in FIG. 8a) may be obtained in certain cases, e.g., where errors or noise were introduced along a path, or if the frequency of the local clock is very different from the incoming data rate (i.e. the incoming bit rate differs from the local bit rate by 25 percent or more). In such a case, data bit values can be assigned to these patterns by making a reasonable estimate as to what the data bit value should be. Alternatively, these unexpected patterns can be used to trigger an ERROR signal output which may be added to the combinational block to indicate any transmission errors at the bit level. The assigned SMPLPOSN_OUT values for these unexpected patterns can be based on the previous values of the SMPLPOSN_OUT signal.

The SMPLPOSN_OUT signal mechanism provides the added benefit of allowing proper data recovery in the presence of timing jitter. Proper recovery will occur in the presence of up to ±0.25 U.I. jitter at any jitter frequency, where U.I. denotes a Unit Interval (CCITT standard). A unit interval is the equivalent of one bit duration, $T_b$ (see FIG. 5a).

Another benefit is that proper data extraction can be performed from pulse width distorted signals. Signals with up to ±25 percent pulse width distortion (PWD) can be recovered properly. PWD is defined here as the difference between the received pulse width (bit width) and the defined pulse width, as a percentage of the defined pulse width. For example, if the received pulse width is 143.2 nanoseconds and the defined pulse width is 130.2 nanoseconds (1/7.68 Mbps), the PWD is calculated as 10 percent. Note that data recovery is possible even with slight differences in frequency (as long as the incoming bit rate is within (±) 25 percent of the local bit rate). This allows up to:

$$\frac{1}{|BR_{IN} - BR_{local}|}$$

bits to be recovered between bit slips which allows clock commands, etc. to be passed along the links. Note that $BR_{IN}$ equals the bit rate of the incoming signal and $BR_{local}$ equals the bit rate of the local switch element.

Bit Slip Detection

A clock switchover to a new clock source will take place in a number of situations, including, after the initialization or reset of a switch, after the detection of an incoming clock failure, and after the receipt of an incoming clock command in the clock subchannel (e.g., ALERT or OVERRIDE, discussed below). During the clock switchover from one communications link to another, there may be a random phase jump (from −180 to +180 degrees) in the data stream driving the local Phase Locked Loop (PLL) circuit of the clock recovery circuit 95 since the signals arriving on each communications link are not phase-aligned as shown in FIG. 3 (for 5 incoming links randomly aligned). This phase jump will force the PLL to slowly shift its output phase until the phase of the PLL gets locked to the new incoming phase.

The phase shift of the local clock can cause a bit slip (a bit loss or bit duplication) in some of the data samplers of the respective switch. After the switchover, the phase of the sampling clock shifts relative to the incoming bit stream until possibly a bit boundary is crossed causing the bit slip. Bit slips may also result in switches that neighbor the initial switch. In the neighboring switches, the phase of the data streams coming from the initial switch shifts relative to the initial switch's sampling clocks until a bit boundary is eventually crossed.

Figure 9:
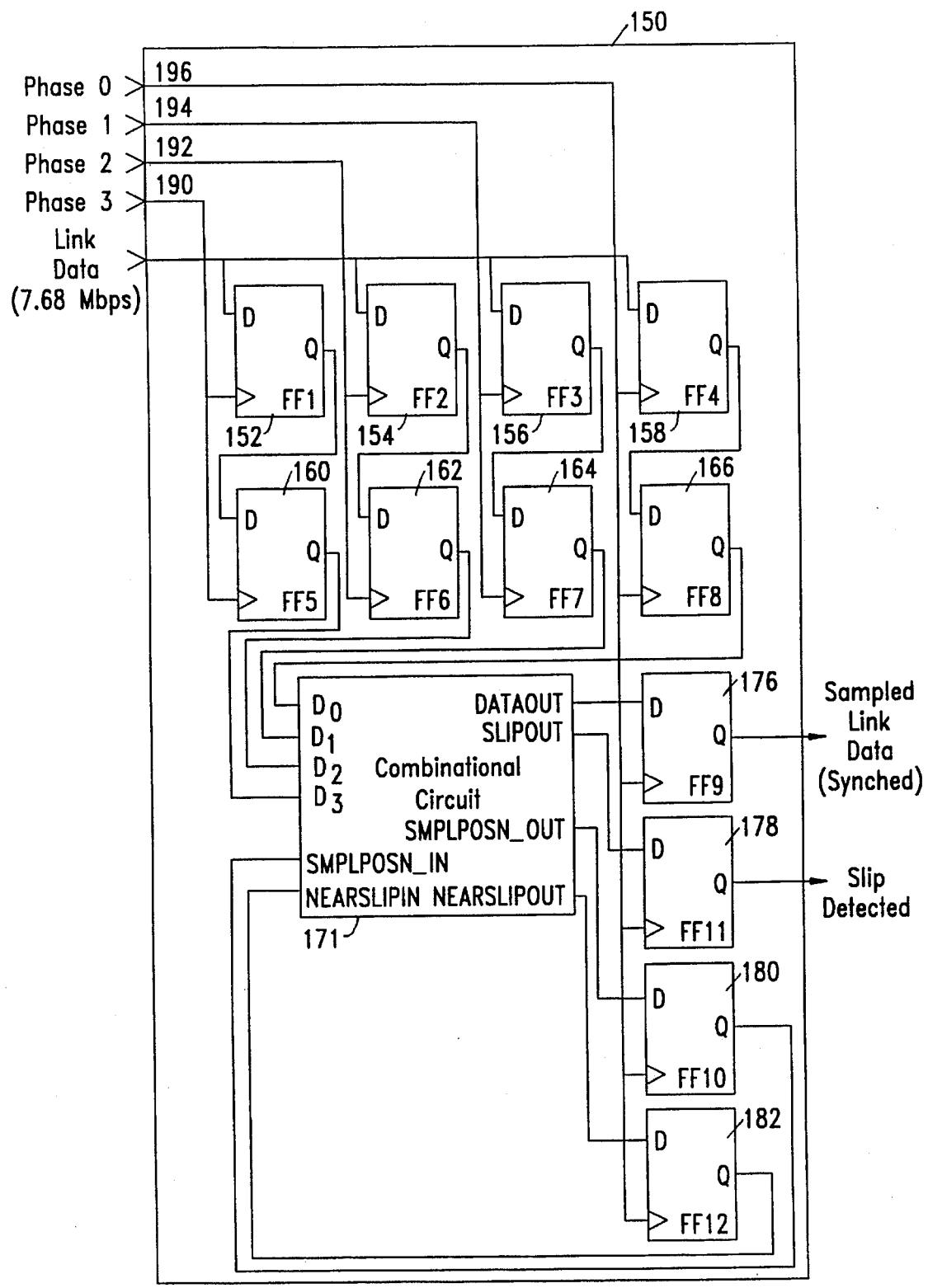
FIG. 9 is a schematic diagram of a data extraction circuit with a bit slip detection mechanism.

In order to prevent the occasional bit slip that may occur in a switch after a switchover from disrupting the system level operations it is desirable to incorporate bit slip detection mechanisms. In the preferred embodiment, the bit slip detection mechanism can be included in the data extraction circuitry (discussed above with respect to FIG. 6) so that a bit slip occurrence is detected simultaneously with the extraction of data. The combined circuitry for data extraction with bit slip detection is shown in FIG. 9. By placing the bit slip mechanism in the data extraction circuitry, the defective data/commands can be immediately discarded, or other appropriate actions can be taken.

Whenever the combinational circuit 171, shown in FIG. 9, detects that the value of SMPLPOSN_OUT does not equal SMPLPOSN_IN for a given bit duration (i.e. when crossing over from sampling the "early" part of a bit to the "late" part of the bit, or vice-versa) there is an indication of a potential bit slip. Thus, the occurrence of a potential bit slip can be detected by a change of the state of the SMPLPOSN_OUT signal. When the value of this signal changes from "early" to "late", the data extraction process is moving from an early sampling to a late sampling, or vice-versa. This sampling movement can cross over a bit boundary and hence cause a bit slip (causing either a duplicated or dropped bit).

Potential bit slips can be detected by observing when the sampling crosses-over from an "early" to a "late" sample (or vice-versa). An actual bit slip occurs only when this sampling cross over takes place and the bit boundary (transition from a one to a zero or vice-versa) is between the middle two samples (i.e. when the four samples occur across two adjacent bits, resulting in the four samples having a pattern of 1100 or 0011).

To implement the bit slip detection procedure, the history of where the last bit boundary occurred relative to the four samples must be kept. A single flip-flop 182, storing the NEARSLIPOUT signal, can be included in the data extraction circuitry, shown in FIG. 9, for storing the history of where the bit transition occurs.

The NEARSLIPOUT signal in FIG. 9 is set (to a value of 1) when the bit boundary is between the middle two of the four samples (i.e., whenever the four samples have a pattern of 1100 or 0011). The NEARSLIPOUT signal is reset (to a value of 0) when the bit transition occurs between the first and second, or third and fourth samples (i.e., when the four samples have patterns of 0001, 0111, 1110, or 1000). When the location of the bit boundary cannot be determined from the four samples (i.e. when the four samples have patterns of 1111 or 0000) the NEARSLIPOUT signal is left unchanged and maintains its previous value (NEARSLIPOUT= NEARSLIPIN).

The SLIPOUT signal in FIG. 9 is generated when only an actual bit slip has occurred, i.e., when SMPLPOSN_OUT does not equal SMPLPOSN_IN and when the NEARSLIPIN signal is set. The DATAOUT and SMPLPOSN_OUT signals in FIG. 9 have been described above relative to FIG. 6.

Figure 10B:
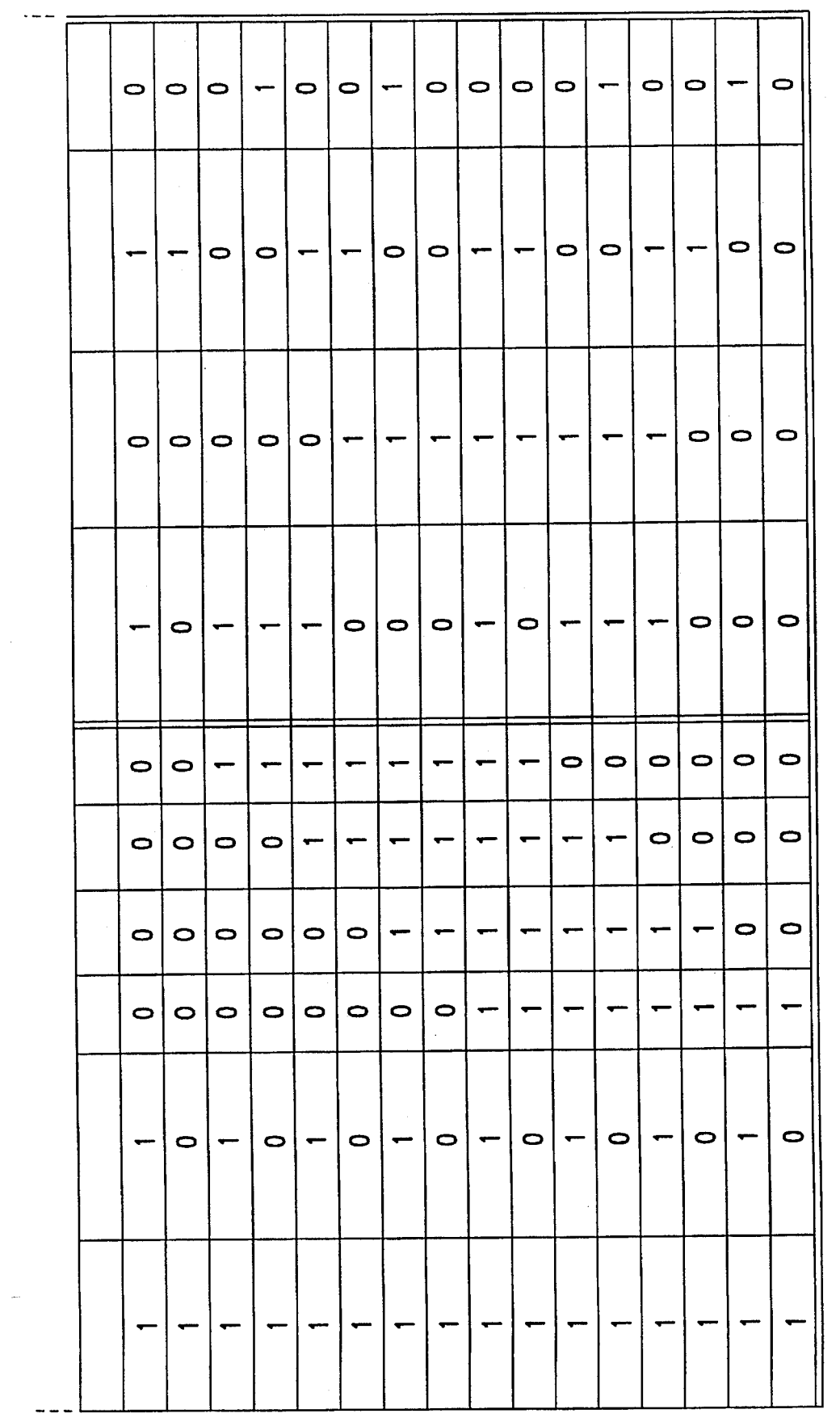

The Combinational Logic Truth Table for the 6-input and 4-output combinational logic circuit 171 is shown in FIG. 10. The truth table of FIG. 10 is implemented as the logic of combinational circuit 171 shown in FIG. 9.

Once a bit slip is detected by the above mechanism, the frame synchronization detection mechanism 155, shown in FIG. 4, should immediately begin looking for the next frame synchronization pattern in Channel 0 so that there will be frame re-synchronization at the beginning of the next frame. The frame synchronization mechanism 155 compares the correct synchronization code (1111100000) with the 10 bit symbol received in Channel 0 subchannel F (FIG. 2). A decision window of 12 bits is preferably utilized in the frame synchronization mechanism 155 which extends the 10-bit symbol by 1-bit on both ends. This allows a correct frame synchronization even in the event of a bit slip in either direction. Whenever the frame synchronization symbol is not recognized within the 12 bit-decision window, the circuit enters the frame searching mode, and an error code is generated.

Preferably after a bit slip detection all of the remaining data and command codes in the respective frame in which the bit slip was detected should be discarded. With this arrangement, a minimal amount of data is lost (maximum 1 frame) and faulty command codes are prevented from causing further problems.

Bit Slip Protection

Additionally, bit-slip-protected error correcting encoding, capable of tolerating single bit slips, should be utilized for the clock subchannel data in order to provide accurate and well protected transmission of this information. The clock subchannel data is comprised of 2 bits to indicate the clock rank ($R_1R_0$) and 2 bits for clock commands (AO). The clock command nibble AO corresponds to the ALERT and OVERRIDE commands. If the local clock subsystem is initiating either one of these states it will transmit the occurrence of this event on its outgoing communications links by setting the corresponding bit for the clock command (ALERT or OVERRIDE) in the next frame. Note that the clock subsystem can never be in both the ALERT and OVERRIDE state, so that a clock command of AO=11 is never valid. The two two-bit nibbles (AO and $R_1R_0$) are both individually encoded into two separate 5 bit words.

A 5-bit slip protected error correcting code consists of those code combinations that can still be decoded after a single bit slip has produced an error in the encoded data. One 2 to 5-bit encoding scheme with slip protected error correcting codes, developed empirically, for the clock subchannel is as follows:

| Encoding Table | | |
| --- | --- | --- |
| 00 | → | 11111 |
| 01 | → | 00111 |
| 10 | → | 11000 |
| 11 | → | 10101. |

The corresponding decoding scheme, capable of tolerating single bit slips in the encoded values is:

| Decoding Table | | |
| --- | --- | --- |
| 11111, 11110 | → | 00 |
| 00011, 00110, 00111, 01110, 01111 | → | 01 |
| 01100, 10000, 10001, 11000, 11001, 11100 | → | 10 |
| 01010, 01011, 10010, 10011, 10100, 10101, 10110, 10111, 11010, 11011 | → | 11 |

Prior to encoding the clock subchannel data, an additional pre-encoding of the data must be performed in order to fulfill the following requirements:
prevent the code combination 11111 from being erroneously decoded into 01, after a bit slip which converts the value into 01111;
prevent the code combination 00111 from being erroneously decoded into 11, after a bit slip which converts the value into 10011;
prevent the occurrence of false frame synchronization patterns (11111.00000)
use an encoding of alternating 0's and 1's for the code that occurs most frequently in normal operation, $AOR_1R_0$= 0011 (i.e., the code corresponding to a clock rank of 3, where $R_1R_0$=11, and no ALERT or OVERRIDE condition, where AO=00).

The pre-encoding and post-decoding tables utilized to implement these requirements are listed below:

| Preencoding table | | | Post-decoding table | | |
|---|---|---|---|---|---|
| $AOR_1R_0$ Step 1: | → | $AOR_1R_0$ | $AOR_1R_0$ Step 1: | → | $AOR_1R_0$ |
| ab.cd Step 2: | → | a*b*.cd | 01.00 Step 2: | → | 11.01 |
| 11.01 | → | 01.00 | ab.cd | → | a*b*.cd |
| 01.cd | → | 01.11 | | | | where a,b,c and d are any data bits; a* is the complement of a; and b* is the complement of b. It should be noted that since the clock subchannel C commands always follow the frame synchronization symbol F (1111100000) in channel 0 (see FIG. 2), the first nibble, AO, of the clock command is always preceded by a 0 (from the frame synchronization symbol). Thus, 00111.xxxxx cannot slip into 10011.xxxxx (where "x" indicates "don't care" bits).

Thus, the list of possible valid encoded values for each set of clock data during normal operation are:

| Clock Data | | Encoded Values |
|---|---|---|
| 00.00 | → | 10101.11111 |
| 00.01 | → | 00111.11111 |
| 00.10 | → | 10101.11000 |
| 00.11 | → | 10101.10101 |
| 01.01 | → | 11000.00111 |
| 01.10 | → | 11000.11000 |
| 01.11 | → | 11000.10101 |
| 10.xx | → | 00111.10101 | where x indicates "don't care" bits.

While the invention has been described in its preferred embodiment, it is to be understood that the words which have been used are words of description, rather than limitation, and that changes may be made within the purview of the appended claims without departing from the true scope and the spirit of the invention in its broader aspects.

What is claimed is:

1. A distributed clocking system for a network of computing elements, comprising:
   a plurality of computing elements, each of said computing elements having a local clock and each of said local clocks being assigned a rank;
   communication paths established between said plurality of computing elements capable of carrying clock information including the rank of said local clock;
   means for transmitting said clock information from each of said computing elements to other computing elements in the network on said communications paths;
   means in each computing element for receiving said clock information transmitted on said communication paths arriving at each computing element; and
   means in each computing element for selecting the clock information containing the highest ranked clock for synchronization of said local clock therein;
   wherein said local clock ranks are assigned by a central processor connected to the network of computing elements and are stored in each computing element.

2. A distributed clocking system for a network of computing elements according to claim 1, wherein one or more of said computing elements are communication switch elements.

3. A distributed clocking system for a network of computing elements according to claim 1, wherein said local clocks may operate in a free-running mode.

4. A clocking system for distributed computing elements, comprising:
   a plurality of computing elements each having a local clock;
   communication paths between said computing elements capable of carrying clock information and voice and data signals;
   means in each computing element for receiving clock information via said communication paths; and
   means in each computing element for selecting incoming clock information for synchronization of said local clock;
   wherein said local clock ranks are assigned by a central processor connected to the network of computing elements and are stored in each computing element.

5. A distributed clocking system for a network of switch elements, comprising:
   a plurality of switch elements, each of said switch elements having a local clock and each of said local clocks being assigned a rank;
   communication paths established between said plurality of switching elements capable of carrying clock information including the rank of said local clock;
   means for transmitting said clock information from each of said switch elements to other switching elements in the network on said communications paths;
   means in each switch element for receiving said clock information transmitted on said communication paths arriving at each switch element;
   means in each switch element for selecting the clock information containing the highest ranked clock for synchronization of said local clock therein;
   wherein said local clock ranks are assigned by a central processor connected to the network of switch elements and are stored in each switch element of the network.

6. A distributed clocking system for a network of switch elements according to claim 5, wherein said local clocks may operate as slaves to an external clock.

7. A distributed clocking system for a network of switch elements according to claim 5, wherein said local clocks may operate as master clocks in a free-running mode.

8. A distributed clocking system for a network of switch elements according to claim 5, wherein said communications paths between the switch elements are also used for carrying voice and data communications.

9. A distributed clocking system for a network of switch elements according to claim 5, wherein said means for transmitting clock information utilizes at least one preselected channel on each communication path for transmitting said clock information.

10. A distributed clocking system for a network of switch elements according to claim 5, wherein said means for receiving said clock information further comprises means for extracting the clock rank from said clock information.

11. A distributed clocking system for a network of switch elements according to claim 5, wherein said means in each switch element for selecting the clock information containing the highest ranked clock further comprises means for comparing said clock rank extracted from said clock information with a clock rank currently being used for synchronization.

12. A distributed clocking system for a network of switch elements according to claim 11, further comprising means for resynchronizing whenever said means for comparing determines that said arriving clock rank is greater than a clock rank currently being used for synchronization.

13. A distributed clocking system for a network of switch elements according to claim 8, wherein the digital signals on each of said outgoing communication paths of a switch element are synchronized and phase-aligned to the local clock therein.

14. A distributed clocking system for a network of switch elements according to claim 5, wherein said central processor continually evaluates the status of said local clocks and updates the ranks of said local clocks as required.

15. A system for recovering from failures in a distributed clocking system for a network of switch elements, comprising:

a plurality of switch elements, each of said switch elements having a local clock and each of said local clocks being assigned a rank;

communication paths established between said plurality of switch elements for carrying clock information from each switch element including the rank of said local clock and a clock failure indication;

means for transmitting said clock information from each of said switch elements to other switch elements in the network over said communications paths;

means for receiving said clock information transmitted on said communications paths at each switch element;

means in each switch element for detecting a clock failure indication in said clock information;

means in each switch element for selecting alternate clock information for synchronization of said local clock whenever a clock failure indication is detected;

wherein said local clock ranks are assigned by a central processor connected to the network of switch elements and are stored in each switch element of the network.

16. A system for recovering from failures in a distributed clocking system for a network of switch elements according to claim 15, wherein said means in each switch element for detecting a clock failure indication further comprises means for detecting a failure in transmission of clock information from other switch elements.

17. A system for recovering from failures in a distributed clocking system for a network of switch elements according to claim 15, wherein said means in each switch element for detecting a clock failure indication further comprises means for detecting a failure in the local clock therein.

18. A system for recovering from failures in a distributed clocking system for a network of switch elements according to claim 15, wherein said means for receiving said clock information further comprises means for extracting said clock rank and clock failure indication from said clock information.

19. A system for recovering from failures in a distributed clocking system for a network of switch elements according to claim 15, further comprising means for transmitting a message to a central processor from a switch element whenever a clock failure indication is detected.

20. A system for recovering from failures in a distributed clocking system for a network of switch elements according to claim 19, wherein a central processor updates the ranks of said local clocks in the network upon notification of a failure of a local clock.

21. A method for synchronizing a network of switch elements wherein a plurality of said switch elements include a local clock and wherein the switch elements are interconnected with communication paths, comprising the steps of:

assigning a rank to each of the local clocks in said network by a central processor connected to the network of switch elements;

storing said rank in each switch element of the network;

providing clock information including the rank of the associated local clock on outgoing transmissions via the communication paths;

receiving the clock information on incoming communications paths to each switch element; and selecting the clock information containing the highest ranked clock available for synchronizing the local clock therein.

22. A method for synchronizing a network of switch elements according to claim 21, wherein said step of transmitting clock information further includes preselecting at least one channel on each communication path for transmitting clock information.

23. A method for synchronizing a network of switch elements according to claim 21, wherein said step of receiving the clock signals further includes the step of extracting the clock rank from said clock information.

24. A method for synchronizing a network of switch elements according to claim 21, wherein said step of selecting the clock information containing the highest ranked clock further includes the step of comparing said clock rank extracted from said clock information with a rank currently being used for synchronization.

25. A method for synchronizing a network of switch elements according to claim 21, wherein said step of selecting the clock information containing the highest ranked clock further includes the step of resynchronizing whenever said comparison step indicates that said arriving clock rank is greater than a clock rank currently being used for synchronization.

26. A method for synchronizing a network of switch elements according to claim 21, wherein said step of transmitting over a plurality of outgoing communication paths further includes the step of synchronizing and phase-aligning digital signals on each of said outgoing communication paths of a switch element to the local clock therein.

27. A method for synchronizing a network of switch elements according to claim 21, wherein said step of transmitting clock information further includes the step of transmitting said clock information together with the voice and data signals.

28. A method for synchronizing a network of switch elements according to claim 21, further including the step of continually evaluating and updating the ranks of said local clocks by a central processor.

29. A method for recovering from failure in a distributed clocking system for a network of switch elements wherein a plurality of switch elements include a local clock and wherein the switch elements are interconnected with communication paths, comprising the steps of:

assigning a rank to each of the local clocks in said network by a central processor connected to the network of switch elements;

storing said rank in each switch element of the network;

providing clock information including the rank of said local clock and a clock failure indication on outgoing transmissions from each switch element via the communication paths;

transmitting said clock information from each of said switch elements to other switch elements in the network over said communication paths;

receiving said clock information transmitted on said communications paths at each switch element;

detecting clock failure indications in said clock information; and selecting alternate clock information for synchronization of said local clock whenever a clock failure indication is detected.

30. A method for recovering from failures in a distributed clocking system according to claim 29, wherein said step of detecting clock failure indications includes the step of detecting a failure in the transmission of clock information from other switch elements.

31. A method for recovering from failures in a distributed clocking system according to claim 29, wherein said step of detecting clock failure indications includes the step of detecting a failure in the local clock therein.

32. A method for recovering from failures in a distributed clocking system according to claim 29, wherein said step of receiving said clock information further includes the step of extracting said clock rank and clock failure indication from said clock information.

33. A method for recovering from failures in a distributed clocking system according to claim 29, further including the step of transmitting a message to a central processor from a switch element whenever a clock failure indication is detected.

34. A method for recovering from failures in a distributed clocking system according to claim 33, further including the step of updating the ranks of said local clocks in the network by said central processor upon notification of a failure of a local clock.

* * * * *